(12) United States Patent
Bahadori et al.

(10) Patent No.: US 12,732,248 B2
(45) Date of Patent: Sep. 8, 2026

(54) SYSTEM AND METHOD FOR SENSING AN ENVIRONMENT

(71) Applicant: Northeastern University, Boston, MA (US)

(72) Inventors: Niloofar Bahadori, Portland, OR (US); Francesco Restuccia, Boston, MA (US)

(73) Assignee: Northeastern University, Boston, MA (US)

( * ) Notice: Subject to any disclaimer, the term of this patent is extended or adjusted under 35 U.S.C. 154(b) by 301 days.

(21) Appl. No.: 17/822,313

(22) Filed: Aug. 25, 2022

(65) Prior Publication Data

US 2023/0072968 A1 Mar. 9, 2023

Related U.S. Application Data

(60) Provisional application No. 63/237,109, filed on Aug. 25, 2021.

(51) Int. Cl.
*G01S 5/00* (2006.01)
*G01S 5/02* (2010.01)
*H04B 7/06* (2006.01)
*H04W 84/12* (2009.01)

(52) U.S. Cl.
CPC ............ *H04B 7/0626* (2013.01); *G01S 5/011* (2020.05); *G01S 5/0205* (2013.01); *H04W 84/12* (2013.01)

(58) Field of Classification Search
None
See application file for complete search history.

(56) References Cited

U.S. PATENT DOCUMENTS

2016/0315682 A1* 10/2016 Liu ........................ H04W 24/08
2019/0020530 A1 1/2019 Au et al.
2021/0105578 A1* 4/2021 Chen ........................ H04R 3/12
(Continued)

OTHER PUBLICATIONS

X. Ding, T. Jiang, Y. Zhong, S. Wu, J. Yang and W. Xue, "Improving WiFi-based Human Activity Recognition with Adaptive Initial State via One-shot Learning," 2021 IEEE Wireless Communications and Networking Conference (WCNC)—Mar. 29-Apr. 1, 2021, Nanjing, China, 2021, pp. 1-6 (Year: 2021).*
(Continued)

*Primary Examiner* — Timothy A Brainard
(74) *Attorney, Agent, or Firm* — Hamilton, Brook, Smith & Reynolds, P.C.

(57) ABSTRACT

A system and corresponding method sense an environment. The system comprises a wireless transmitter device that transmits a wireless signal through the environment. The system further comprises a plurality of wireless receivers that each 1) receive the wireless signal at a distinct location within the environment via at least one respective antenna and 2) generate a channel state information (CSI) packet indicating a state of a wireless communications channel associated with the wireless signal. The system still further comprises a computing device and classifier. The computing device processes the CSI packets from the plurality of wireless receivers and generates a CSI dataset as a function of the CSI packets processed. The classifier determines at least one class for the CSI dataset. The system and corresponding method improve robustness of sensing operations, such as robustness of Wi-Fi sensing operations to noise and interference.

23 Claims, 13 Drawing Sheets

(56) References Cited

U.S. PATENT DOCUMENTS

| | | | | |
|---|---|---|---|---|
| 2021/0135711 | A1* | 5/2021 | Beg | H04B 7/043 |
| 2021/0181332 | A1* | 6/2021 | Yun | G01S 7/025 |
| 2021/0247483 | A1* | 8/2021 | Wang | G01S 13/003 |
| 2022/0124154 | A1 | 4/2022 | Zou et al. | |
| 2022/0399920 | A1 | 12/2022 | Janco et al. | |
| 2023/0101247 | A1 | 3/2023 | Restuccia et al. | |
| 2024/0036227 | A1 | 2/2024 | Otsuki et al. | |

OTHER PUBLICATIONS

Bejarano, et al., "IEEE 802.11ac: From Channelization to Multi-User MIMO," Minyoung Park, Intel Corporation, IEEE Communications Magazine, Oct. 2013.
Ioffe, et al., "Batch Normalization: Accelerating Deep Network Training by Reducing Internal Covariate Shift;" Proceedings of the 32nd International Conference on Machine Learning, Lille, France, 2015. JMLR: W&CP vol. 37. Copyright 2015 by the author(s).
Kingma, et al., "ADAM: A Method for Stochastic Optimization;" Published as a conference paper at ICLR 2015, Jan. 30, 2017.
Ma, et al., "WiFi Sensing with Channel State Information: A Survey;" CM Comput. Surv., vol. 1, No. 1, Article 1; Jan. 2019.
Muaaz, et al., "Wi-Sense: a passive human activity recognition system using Wi-Fi and convolutional neural network and its integration in health information systems;" Annals of Telecommunications (2022) 77:163-175.
Shi, et al., "Environment-Robust Device-Free Human Activity Recognition With Channel-State-Information Enhancement and One-Shot Learning;" IEEE Transactions on Mobile Computing, Jul. 2020.
Snell, et al., "Prototypical Networks for Few-shot Learning;" 31st Conference on Neural Information Processing Systems (NIPS 2017), Long Beach, CA, USA.
Vinyals, et al., "Matching Networks for One Shot Learning;" 30th Conference on Neural Information Processing Systems (NIPS 2016), Barcelona, Spain.
Bahadori, et al., "ReWiS: Reliable Wi-Fi Sensing Through Few-Shot Multi-Antenna Multi-Receiver CSI Learning;" Institute for the Wireless Internet of Things, Northeastern University, United States, Apr. 19, 2022.
A. Al-Shawabka, et al. "Exposing the Fingerprint: Dissecting the Impact of the Wireless Channel on Radio Fingerprinting," in Proc. of IEEE Infocom, 2020.
E. H. Ong, et al., "IEEE 802.11ac: Enhancements for very high throughput WLANs," in Proc. of IEEE PIMRC, 2011.
F. Restuccia, et al., "DeepRadioID: Real-Time Channel-Resilient Optimization of Deep Learning-based Radio Fingerprinting Algorithms," in Proc. of ACM MobiHoc, 2019.
Gast, "802.11ac: A Survival Guide by Matthew S. Gast," Chapter 4. Beamforming in 802.11ac, O'Reilly Media, Inc., 2022.
IEEE, "IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment 4: Enhancements for Very High Throughput for Operation in Bands below 6 Ghz," IEEE SID 802.11ac-2013 (Amendment to IEEE SID 802.11-2012), 2013.
K. Merchant, et al., "Deep Learning for RF Device Fingerprinting in Cognitive Communication Networks," IEEE Journal Of Selected Topics in Signal Processing, vol. 12, No. 1, pp. 160-167, 2018.
K. Sankhe, et al., "ORACLE: Optimized Radio clAssification through Convolutional neural nEtworks," in Proc. of IEEE Infocom, 2019.
Meneghello, et al., "DeepCSI: Rethinking Wi-Fi Radio FingerprintingThrough MU-MIMO CSI Feedback Deep Learning," Apr. 15, 2022, presented at IEEE ICDCS, Bologna, Italy, Jul. 10-13, 2022.
R. Das, et al., "A Deep Leaming Approach to IoT Authentication," in Proc. of IEEE ICC, 2018.
S. D'Oro, F. Restuccia, and T. Melodia, "Can You Fix My Neural Net-work? Real-Time Adaptive Waveform Synthesis For Resilient Wireless Signal Classification," in Proc. of IEEE Infocom, 2021.
S. Gopalakrishnan, M. Cekic, and U. Madhow, "Robust Wireless Fingerprinting via Complex-Valued Neural Networks," in Proc. of IEEE Globecom, 2019.
S. Riyaz, K. et al., "Deep Learning Convolutional Neural Networks for Radio Identification," IEEE Communications Magazine, vol. 56, No. 9, pp. 146-152, 2018.
T. D. Vo-Huu, et al., "Fingerprinting Wi-Fi Devices Using Software Defined Radios," in Proc. of ACM WiSec, 2016.

* cited by examiner

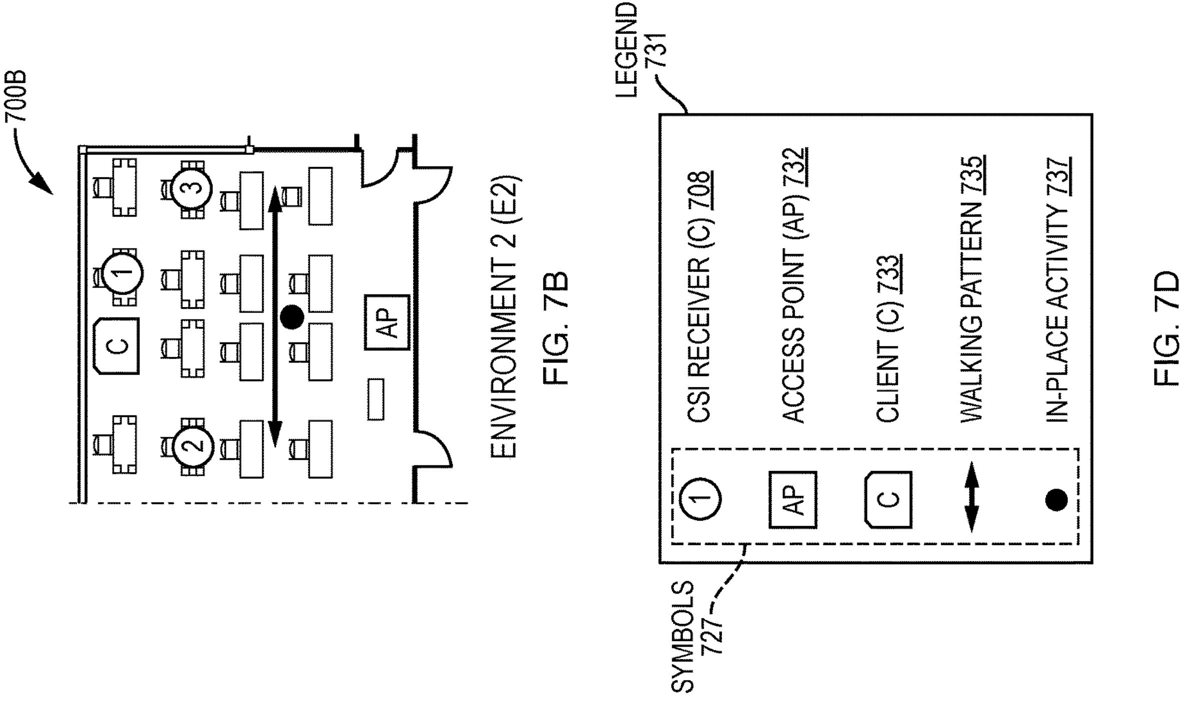
FIG. 7B
FIG. 7D
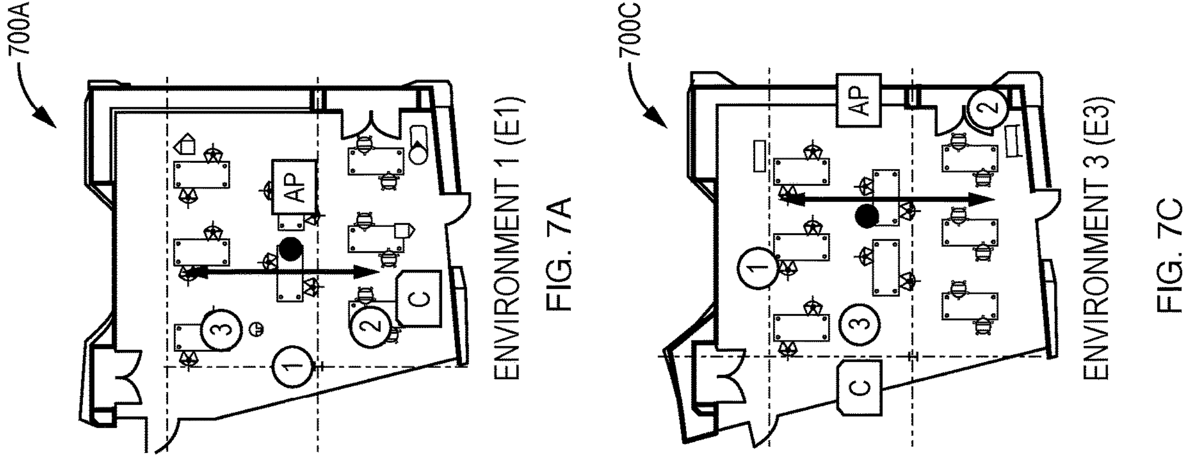
FIG. 7A
FIG. 7C 800B
0
0.5
1
ACTUAL ACTIVITY
EMPTY
JUMP
STAND
WALK
PREDICTED ACTIVITY
1.00
0.00
0.05
0.95

800A
0.03
0.97
0.01

900

| AREA | RX. | ANTENNA | EMPTY | | JUMPING | | STANDING | | WALKING | | MEAN | |
|---|---|---|---|---|---|---|---|---|---|---|---|---|
| | | | ACCURACY | F1 SCORE | ACCURACY | F1 SCORE | ACCURACY | F1 SCORE | ACCURACY | F1 SCORE | ACCURACY | F1 SCORE |
| $E_1$ | 1 | 1 | 100 | 0.9967 | 85.34 | 0.9412 | 82.67 | 0.8575 | 79.00 | 0.8531 | 87.00 | 0.9076 |
| | 1 | 4 | 100 | 0.9852 | 98.00 | 0.9484 | 94.00 | 0.9292 | 85.67 | 0.9212 | 94.41 | 0.9460 |
| | 3 | 1 | 100 | 1.0000 | 100 | 0.9891 | 98.63 | 0.9905 | 98.67 | 0.9928 | 99.32 | 0.9931 |
| | 3 | 4 | 100 | 1.0000 | 100 | 1.0000 | 99.28 | 0.9960 | 100 | 0.9980 | 99.82 | 0.9977 |
| $E_2$ | 1 | 1 | 100 | 0.9804 | 78.00 | 0.7091 | 62.00 | 0.6392 | 73.00 | 0.8022 | 78.25 | 0.7827 |
| | 1 | 4 | 100 | 1.0000 | 91.00 | 0.8778 | 83.33 | 0.8460 | 87.33 | 0.8927 | 90.42 | 0.9041 |
| | 3 | 1 | 100 | 1.0000 | 98.00 | 0.9018 | 80.00 | 0.8775 | 93.00 | 0.9884 | 92.75 | 0.9417 |
| | 3 | 4 | 100 | 1.0000 | 100 | 0.9800 | 95.40 | 0.9853 | 100 | 1.0000 | 98.85 | 0.9085 |
| $E_3$ | 1 | 1 | 100 | 0.9967 | 74.37 | 0.7348 | 87.67 | 0.7799 | 59.00 | 0.6933 | 80.25 | 0.8012 |
| | 1 | 4 | 100 | 0.9852 | 95.00 | 0.8810 | 92.00 | 0.9049 | 75.67 | 0.8599 | 90.67 | 0.9078 |
| | 3 | 1 | 100 | 1.0000 | 100 | 0.9747 | 94.63 | 0.9649 | 97.67 | 0.9827 | 98.07 | 0.9806 |
| | 3 | 4 | 100 | 1.0000 | 98.67 | 0.9852 | 97.00 | 0.9848 | 100 | 1.0000 | 99.25 | 0.9925 |

FIG. 9

SYSTEM AND METHOD FOR SENSING AN ENVIRONMENT

RELATED APPLICATION

This application claims the benefit of U.S. Provisional Application No. 63/237,109, filed on Aug. 25, 2021. The entire teachings of the above application are incorporated herein by reference.

BACKGROUND

Wi-Fi is a wireless networking technology that allows devices, such as computers (e.g., laptops, desktops, etc.), mobile devices (e.g., smart phones, wearables, etc.), and other equipment (e.g., printers, video cameras, etc.) to interface with the Internet.

SUMMARY

According to an example embodiment, a system for sensing an environment comprises a wireless transmitter device configured to transmit a wireless signal through the environment. The system further comprises a plurality of wireless receivers each configured to 1) receive the wireless signal at a distinct location within the environment via at least one respective antenna and 2) generate a channel state information (CSI) packet indicating a state of a wireless communications channel associated with the wireless signal. The system further comprises a computing device configured to process the CSI packets from the plurality of wireless receivers and generate a CSI dataset as a function of the CSI packets processed. The system still further comprises a classifier configured to determine at least one class for the CSI dataset At least one wireless receiver of the plurality of wireless receivers may include a plurality of respective antennas including the at least one respective antenna.

The at least one wireless receiver of the plurality of wireless receivers may be further configured to generate the CSI packet as a function of the wireless signal as received at each of the plurality of respective antennas.

The CSI packet generated by the at least one wireless receiver of the plurality of wireless receivers may indicate the state of the wireless communications channel at a plurality of distinct spatial points in the environment. Each distinct spatial point of the distinct spatial points may correspond to a respective one of the plurality of respective antennas.

The computing device may be further configured to process the CSI packets by removing a subset of information from the CSI packets based on a measured value of the subset.

The CSI packets may indicate the state of the wireless communications channel at a plurality of distinct points in time and frequency.

At least one wireless receiver of the plurality of wireless receivers may be configured to generate a plurality of CSI packets of the CSI packets. Each CSI packet of the plurality of CSI packets may indicate the state of the wireless communications channel at a distinct point in time and frequency.

The classifier may be trained via a training dataset and a few-shot learning (FSL) process.

The classifier may be further configured to determine the at least one class based on at least one previous class that was determined for a prior CSI dataset obtained at an earlier point in time relative to the CSI dataset.

The at least one class may include classes corresponding to at least one of i) no movement within the environment and ii) movement of an object within the environment, for non-limiting example.

The at least one class may include classes corresponding to at least one of i) no persons within the environment, ii) a person walking within the environment, iii) a person running within the environment, iv) a person jumping within the environment, and v) a person respiring within the environment, for non-limiting example.

For non-limiting example, the at least one class may include a class corresponding to human activity recognition.

According to another example embodiment, a method for sensing an environment may comprise transmitting a wireless signal through the environment. The method may further comprise, at each wireless receiver or a plurality of wireless receivers, 1) receiving the wireless signal at a distinct location within the environment via at least one respective antenna and 2) generating a channel state information (CSI) packet indicating a state of a wireless communications channel associated with the wireless signal. The method may still further comprise processing the CSI packets from the plurality of wireless receivers, generating a CSI dataset as a function of the CSI packets processed, and determining at least one class for the CSI dataset generated.

Alternative method embodiments parallel those described above in connection with the example system embodiment.

According to yet another example embodiment, a non-transitory computer-readable medium for sensing an environment has encoded thereon a sequence of instructions which, when loaded and executed by at least one processor, causes the at least one processor to process channel state information (CSI) packets received from a plurality of wireless receivers. Each wireless receiver of the plurality of wireless receivers has 1) received a wireless signal at a distinct location within the environment via at least one respective antenna and 2) generated a CSI packet of the CSI packets received. The CSI packet indicates a state of a wireless communications channel associated with the wireless signal, the wireless signal having been transmitted through the environment. The sequence of instructions further causes the at least one processor to generate a CSI dataset as a function of the CSI packets processed and determine at least one class for the CSI dataset generated.

Alternative non-transitory computer-readable medium embodiments parallel those described above in connection with the example system embodiment.

It should be understood that example embodiments disclosed herein can be implemented in any combination and in the form of a method, apparatus, system, or non-transitory computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 7A-C are schematic diagrams of example embodiments of data collection and testing environments used in experiments disclosed herein.

FIG. 7D is a legend of symbols used in FIGS. 7A-C.

FIG. 9 is a table that includes example embodiments of experimental results that represent an impact of micro- and macro-diversity on the accuracy of predictions.

DETAILED DESCRIPTION

Figure 1:
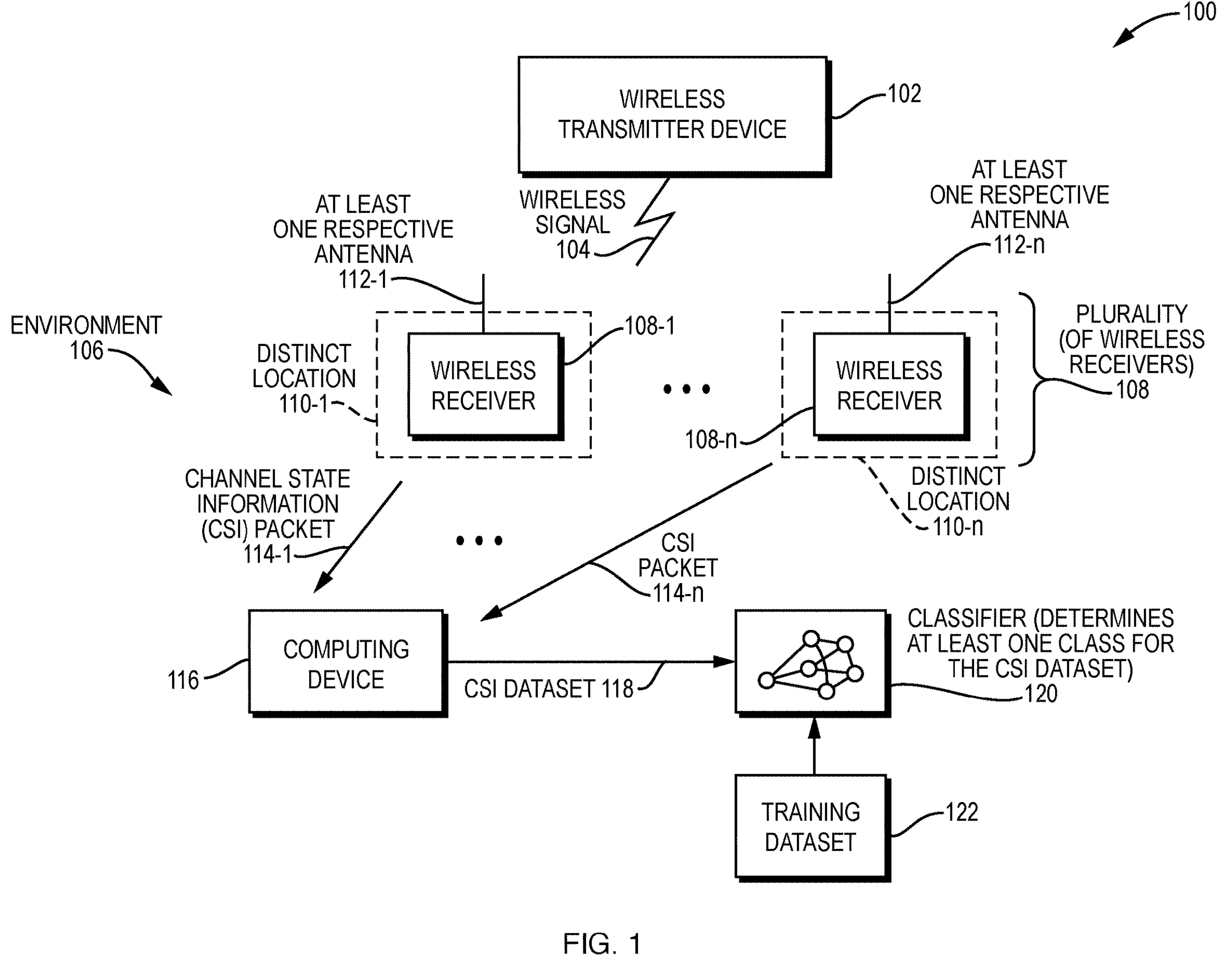
FIG. 1 is a block diagram of an example embodiment of a system for sensing an environment.

A description of example embodiments follows.

While an example embodiment disclosed herein may be described with reference to Wi-Fi (WiFi), it should be understood that such embodiment is not limited to Wi-Fi as a wireless technology. Further, it should be understood that a wireless transmitter and wireless receiver disclosed herein is not limited to functioning as a wireless transmitter and wireless receiver, respectively, as such wireless devices may be wireless transceivers.

I. Overview of Wi-Fi and Example Embodiments

Wi-Fi has become one the most pervasive wireless technologies ever invented. Indeed, Wi-Fi is ubiquitous and provides wireless connectivity to almost any device of common use, including smartphones, tablets, laptop computers, and wearable devices. Just to give an idea of how fast Wi-Fi is growing, Cisco forecast that Wi-Fi 6 hotspots are expected to grow 13-fold from 2020 to 2023 (U. Cisco, "Cisco annual internet report (2018-2023) white paper," Online (accessed Mar. 26, 2021) https://www.cisco.com/c/en/us/solutions/collateral/executive-perspectives/annual-internet-report/whitepaper-c11-741490.html, 2020.). Given their ever-increasing ubiquitousness, significant research efforts have investigated the usage of Wi-Fi waveforms to perform device-free classification, also called Wi-Fi sensing. An excellent survey on the topic can be found in (Y. Ma, G. Zhou, and S. Wang, "WiFi Sensing with Channel State Information: A Survey," ACM Computing Surveys (CSUR), vol. 52, no. 3, pp. 1-36, 2019). In a nutshell, Wi-Fi sensing is based on passive monitoring of the changes in the channel frequency response (CFR) produced by the presence of scatterers located between the Wi-Fi transmitters and the Wi-Fi receivers.

These sudden changes in CFR can be evaluated by estimating the channel state information (CSI) through the pilots contained in every Wi-Fi frame preamble (O. Bejarano, E. W. Knightly, and M. Park, "IEEE 802.11ac: from Channelization to Multi-user MIMO," IEEE Communications Magazine, vol. 51, no. 10, pp. 84-90, 2013). This way, highly-innovative applications, such as human activity recognition (HAR), remote health monitoring, and surveillance can be implemented (H. Jiang, C. Cai, X. Ma, Y. Yang, and J. Liu, "Smart Home Based on WiFi Sensing: A Survey," IEEE Access, vol. 6, pp. 13317-13325, 2018). Attesting to the relevance of these applications, in September 2020, IEEE 802.11 has approved a new technical group (TG) called IEEE 802.11bf (IEEE 802.11bf Task Group (TG), "IEEE 802.11bf (TGbf) Project Authorization Request (PAR)." https://tinyurl.com/TGbfPAR, 2021). According to the website, TGbf will define modifications to state-of-the-art IEEE 802.11 standards at both the Medium Access Control (MAC) and physical layer (PHY) to accommodate sensing operations between 1 GHz and 7.125 GHz, as well as above 45 GHz (i.e., millimeter wave frequencies).

As Wi-Fi sensing applications come into the market, it becomes useful to improve the robustness of Wi-Fi sensing operations to noise and interference, as well as their amenability to generalize to multiple operational environments. For example, if a sensing application fails to detect intruders in a smart home scenario, or stops working when deployed in a new home, it may have severe repercussions in both commercialization efforts as well as the well-being of the final users. Although existing work—discussed in detail in Section II—has proposed CSI-based sensing, such work fails to generalize to multiple environments, and does not address how to improve the robustness of the methods. An example embodiment of a system for sensing an environment with improved robustness is disclosed below with regard to FIG. 1.

FIG. 1 is a block diagram of an example embodiment of a system 100 for sensing an environment 106. The system 100 comprises a wireless transmitter device 102 configured to transmit a wireless signal 104 through the environment 106. The system 100 further comprises a plurality 108 of wireless receivers (108-1, . . . , **108-*n*) each configured to 1) receive the wireless signal 104 at a distinct location (110-1, . . . , 110-*n*) within the environment 106 via at least one respective antenna (112-1, . . . , 112-*n*) and 2) generate a channel state information (CSI) packet (114-1, . . . , 114-*n*) indicating a state (not shown) of a wireless communications channel (not shown) associated with the wireless signal 104. The system 100 further comprises a computing device 116 configured to process the CSI packets (114-1, . . . , 114-*n*) from the plurality 108 of wireless receivers (108-1, . . . , 108-*n*) and generate a CSI dataset 118 as a function of the CSI packets (114-1, . . . , 114-*n*) processed. The system 100 further comprises a classifier 120 configured to determine at least one class (not shown) for the CSI dataset 118. According to an example embodiment, the classifier 120 may also be referred to as a trained classifier that has been trained based on a training dataset 122. For non-limiting example, the classifier 120 may be further configured to determine the at least one class based on the training dataset 122**.

At least one wireless receiver of the plurality 108 of wireless receivers (108-1, . . . , **108-*n*) may include a plurality of respective antennas (not shown) including the at least one respective antenna (e.g., 112-1, . . . , or 112-*n*). The at least one wireless receiver of the plurality 108 of wireless receivers (108-1, . . . , 108-*n*) may be further configured to generate the CSI packet (e.g., 114-1, . . . , or 114-*n*) as a function of the wireless signal 104 as received at each of the plurality of respective antennas (112-1, . . . , and 112-*n***).

The CSI packet (e.g., 114-1, . . . , or **114-*n*) generated by the at least one wireless receiver of the plurality 108 of wireless receivers (108-1, . . . , 108-*n*) may indicate the state of the wireless communications channel at a plurality of distinct spatial points in the environment 106. Each distinct spatial point of the distinct spatial points may correspond to a respective one of the plurality of respective antennas. The CSI packets (114-1, . . . , 114-*n***) may indicate the state of the wireless communications channel at a plurality of distinct points in time and frequency.

According to an example embodiment, the computing device 116 may be further configured to process the CSI packets (114-1, . . . , **114-*n*) by removing a subset of information (not shown) from the CSI packets (114-1, . . . , 114-*n*) based on a measured value (not shown) of the subset. At least one wireless receiver of the plurality 108 of wireless receivers (108-1, . . . , 108-*n*) may be configured to generate a plurality (not shown) of CSI packets of the CSI packets (114-1, . . . , 114-*n*). For example, the CSI packet 114-1 may be a plurality of CSI packets for non-limiting example. Further, according to an example embodiment, each CSI packet of the plurality of CSI packets (114-1, . . . , 114-*n***) may indicate the state of the wireless communications channel at a distinct point in time and frequency.

According to an example embodiment, the classifier 120 may be trained via the training dataset 122 and a few-shot learning (FSL) process (not shown). The classifier 120 may be further configured to determine the at least one class based on at least one previous class (not shown) that was determined for a prior CSI dataset (not shown) obtained at an earlier point in time relative to the CSI dataset 118. The at least one class may include classes corresponding to at least one of i) no movement within the environment and ii) movement of an object within the environment for non-limiting example. Alternatively, or in addition, the at least one class may include classes corresponding to at least one of i) no persons within the environment, ii) a person walking within the environment, iii) a person running within the environment, iv) a person jumping within the environment, and v) a person respiring within the environment for non-limiting example. For non-limiting example, the at least one class may include a class corresponding to human activity recognition. An example embodiment of a method that may determine the at least one class is disclosed below with regard to FIG. 2.

Figure 2:
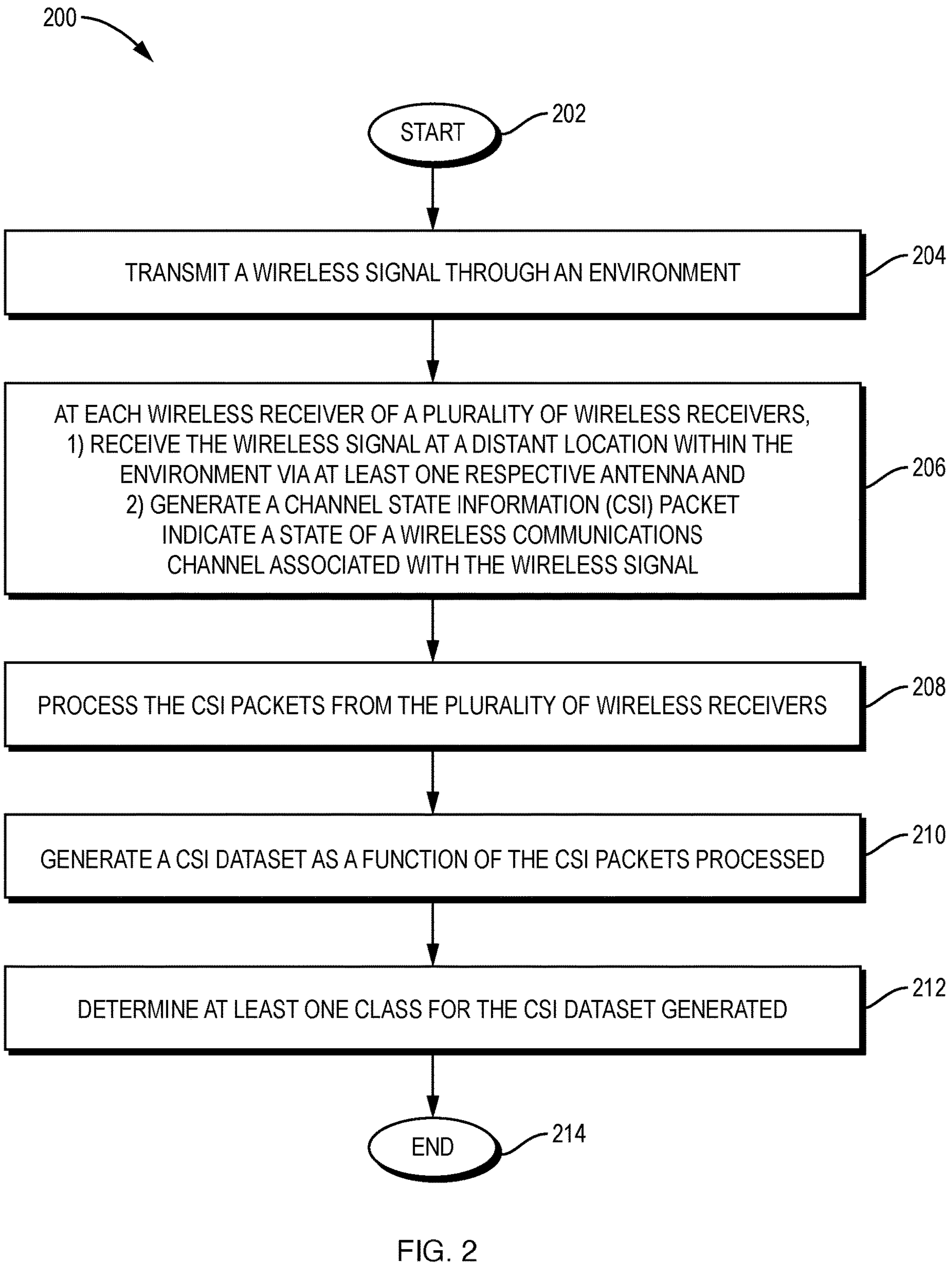
FIG. 2 is a flow diagram of an example embodiment of a method for sensing an environment.

FIG. 2 is a flow diagram of an example embodiment of a method (200) for sensing an environment. The method begins (202) and transmits a wireless signal through the environment (204). The method further comprises, at each wireless receiver of a plurality of wireless receivers, 1) receiving the wireless signal at a distinct location within the environment via at least one respective antenna and 2) generating a channel state information (CSI) packet indicating a state of a wireless communications channel associated with the wireless signal (206). The method further comprises processing the CSI packets from the plurality of wireless receivers (208), generating a CSI dataset as a function of the CSI packets processed (210), and determining at least one class for the CSI dataset generated (212). The method thereafter ends (214) in the example embodiment. Further details and embodiments are disclosed below.

As noted above, Wi-Fi is ubiquitous. Thanks to the ubiquitousness of Wi-Fi access points and devices, Wi-Fi sensing enables transformative applications in remote health care, home/office security, and surveillance, just to name a few. Existing work has explored the usage of machine learning (ML) on channel state information (CSI) computed from Wi-Fi packets to classify events of interest. However, most of these methods require a significant amount of data collection, as well as extensive computational power for additional CSI feature extraction. Moreover, the majority of these models suffer from poor accuracy when tested in a new/untrained environment. An example embodiment of ReWiS is disclosed herein, a novel framework for robust and environment-independent Wi-Fi sensing. An advantageous example embodiment of ReWiS is to leverage multi-antenna, multi-receiver diversity as disclosed above with regard to FIG. 1 and FIG. 2, as well as fine-grained frequency resolution, to improve the overall robustness of the methods.

In addition, an example embodiment of ReWiS may leverage few-shot learning (FSL) as the inference engine, which (i) reduces the need for extensive data collection and application-specific feature extraction; and (ii) can rapidly generalize to new tasks by only leveraging a few new samples. Further, an example embodiment disclosed below is based on singular value decomposition (SVD) to make the FSL input constant irrespective of the number of receiver antennas.

As disclosed further below, ReWiS has been prototyped using off-the-shelf Wi-Fi equipment and its performance showcased by considering a compelling use case of human activity recognition. An extensive data collection campaign was performed in three different propagation environments with two human subjects, as disclosed further below. The impact of each diversity component on the performance was evaluated and ReWiS compared with a traditional convolutional neural network (CNN) approach. Experimental results, disclosed further below, show that ReWiS improves the performance by about 40% with respect to existing single-antenna low-resolution approaches. Moreover, when compared to a CNN-based approach, ReWiS shows 35% more accuracy and less than 10% drop in accuracy when tested in different environments, while the CNN drops by more than 45%.

An example embodiment of ReWiS is disclosed above with regard to FIG. 1 and FIG. 2, and below with regard to FIG. 3. ReWiS is the first framework leveraging multi-antenna, multi-frame, multi-receiver CSI data to improve the robustness of Wi-Fi sensing operations. It should be understood, however, that such wireless sensing operations are not limited to Wi-Fi.

Figure 3:
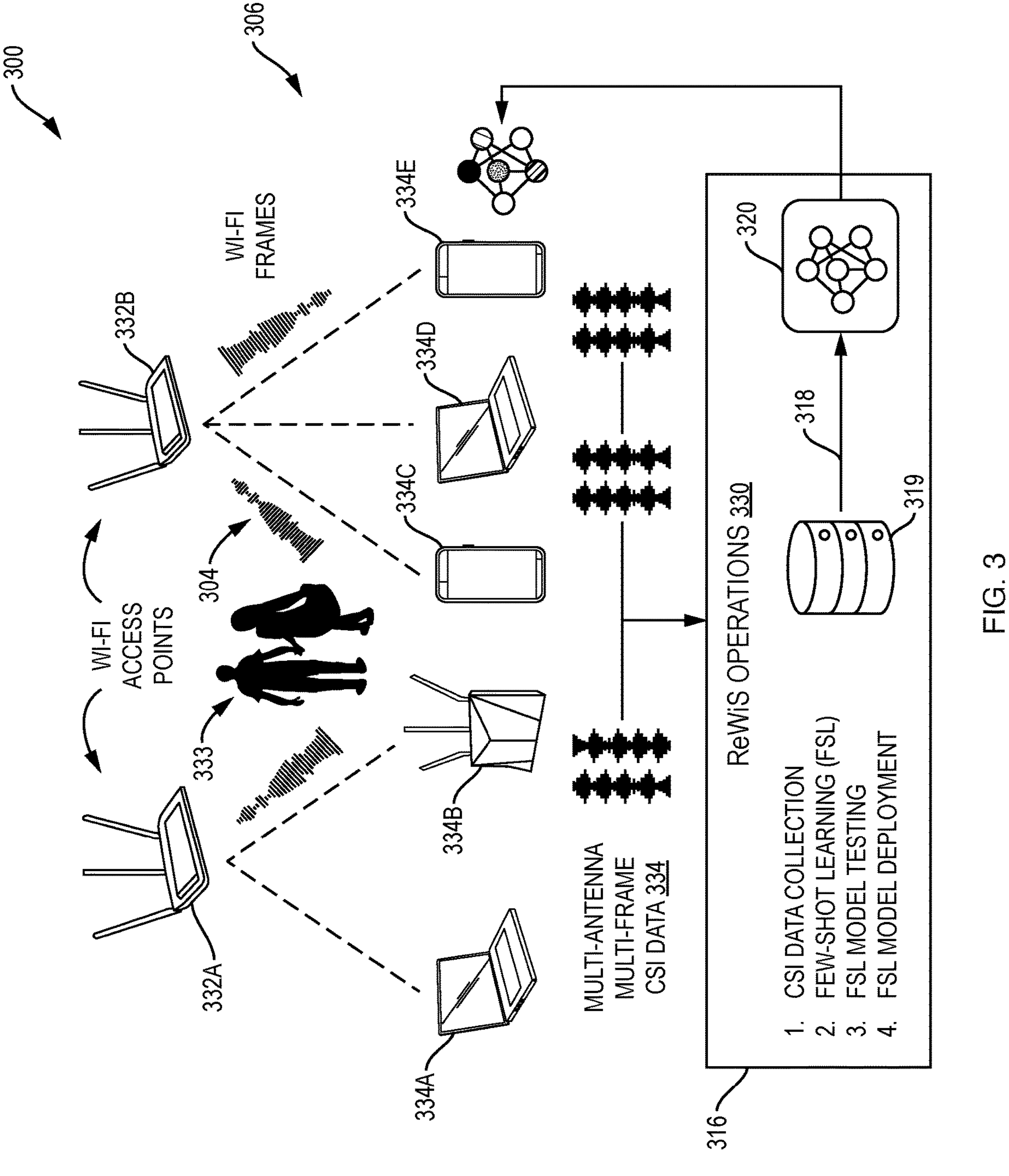
FIG. 3 is a block diagram of an example embodiment of a high-level overview of reliable Wi-Fi Sensing (ReWiS).

FIG. 3 is a block diagram 300 of an example embodiment of a high-level overview of reliable Wi-Fi Sensing (ReWiS) and its operations 330. The block diagram 300 includes Wi-Fi access points (**332*a*, 332*b*) and multiple devices (334*a*, . . . , 334*e*) that support wireless connectivity. The block diagram further includes a computing device 316 and, in the example embodiment, the computing device 316 includes a classifier 320**.

In the example embodiment of FIG. 3, the device **334*c* may transmit a wireless signal 304 through an environment 306. The device 334*d* and device 334*e* may have respective wireless receivers (not shown) and such wireless receivers may receive the wireless signal 304 via the Wi-Fi access point 332 for non-limiting example. The wireless signal 304 may include information (not shown) originating from a mobile device (not shown) or a user 333. The wireless receivers may each be configured to 1) receive the wireless signal 304 at a distinct location within the environment 306 via at least one respective antenna (not shown) and 2) generate a channel state information (CSI) packet (not shown) included in the multi-antenna multi-frame CSI data 334. The CSI packet may indicate a state (not shown) of a wireless communications channel (not shown) associated with the wireless signal 304. The computing device 316 may be configured to process the CSI packets from the plurality of wireless receivers, namely the multi-antenna multi-frame CSI data 334, and generate a CSI dataset 318 as a function of the CSI packets processed. The classifier 320 may be configured to determine at least one class (not shown) for the CSI dataset 318. According to an example embodiment, the classifier 320 may be a trained classifier that has been trained based on a training dataset (not shown). For non-limiting example, the classifier 320 may be further configured to determine the at least one class based on the training dataset. The training dataset and CSI dataset 318 may be included in a classifier dataset 319** for non-limiting example. Determination of the at least one class may advantageously enable ReWiS.

A fundamental difference of ReWiS with respect to existing work is to leverage spatial diversity (i.e., multiple receivers and multiple antennas per receiver), time diversity (i.e., multiple CSI measurements), and increased subcarrier resolution to significantly improve the robustness of the sensing process. Moreover, instead of relying on traditional convolutional neural network (CNN)-based learning, ReWiS tackles the key problem of generalization through an approach based on few-shot learning (FSL), which (i) reduces the need of extensive data collection; and (ii) allows ReWiS to rapidly generalize to new tasks by only leveraging a few new samples.

Although existing work has proposed FSL to address CSI learning (Z. Shi, J. A. Zhang, Y. D. R. Xu, and Q. Cheng, "Environment-Robust Device-free Human Activity Recognition with Channel-State Information Enhancement and One-Shot Learning," IEEE Transactions on Mobile Computing, 2020), it is based on application-dependent embedding extraction using a long short-term memory (LSTM)-based technique called matching network (MatNet) (O. Vinyals, C. Blundell, T. Lillicrap, D. Wierstra, et al., "Matching Networks for One Shot Learning," Advances in Neural Information Processing Systems, vol. 29, pp. 3630-3638, 2016), which ultimately limits its applicability to a single application and adds to the computational complexity of the approach. In this work, an approach called prototypical networks (ProtoNets) (J. Snell, K. Swersky, and R. S. Zemel, "Prototypical Networks for FewShot Learning," arXiv preprint arXiv: 1703.05175, 2017) may be used to do away with application-specific feature extraction, thus improving generalizability and computational burden.

An example embodiment of ReWiS is disclosed herein, a novel framework for robust and environment-independent CSI-based Wi-Fi sensing (Section III). For non-limiting example, core design principles behind the ReWiS may (i) leverage multi-antenna, multi-receiver diversity, as well as fine-grained frequency resolution to improve the overall robustness of the methods; and (ii) leverage a customized version of FSL to (a) remove the need of application-specific feature extraction; and (b) help generalize to new environments by only leveraging a limited number of new samples (Section III-A).

An example embodiment includes a technique based on singular value decomposition (SVD) to make the FSL input constant irrespective of the number of receiver antennas and window size (Section III-B). To give a perspective, in an example embodiment of a dataset, the input size is reduced by about 80% of the original size.

An example embodiment of a prototype of ReWiS is disclosed herein in which off-the-shelf Wi-Fi equipment is used to showcase performance of ReWiS by considering human activity recognition as a use case (Section IV). An extensive data collection campaign is performed in three different propagation environments with two human subjects (IRB approval available upon request). The impact of each diversity component on the performance is evaluated and the ReWiS is compared with a traditional convolutional neural network (CNN) approach. Experimental results (Section V) show that the ReWiS improves the performance by about 40% with respect to existing single-antenna low-resolution approaches. Moreover, when compared to a CNN-based approach, ReWiS shows 35% more accuracy and less than 10% drop in accuracy when tested in unseen environments, while the CNN performance drops by more than 45%.

II. Wi-Fi Sensing Overview

In this section, some background notions on WiFi sensing are presented, as well as the novelty of example embodiments disclosed herein. First, Wi-Fi sensing and channel state information (CSI) learning is summarized in Sections II-A and II-B. Then, CSI collection methodologies and current CSI dataset availability are summarized in Section II-C.

A. Wi-Fi Sensing

The main idea behind Wi-Fi sensing is that the presence of moving objects alters the propagation environment throughout time and frequency. Thus, information on the presence/motion of objects in the environment can be captured by analyzing the received Wi-Fi signal. Thus, Wi-Fi sensing has been utilized in a wide range of sensing applications such as smart homes (Y. Ren, S. Tan, L. Zhang, Z. Wang, Z. Wang, and J. Yang, "Liquid level sensing using commodity wifi in a smart home environment," Proceedings of the ACM on Interactive, Mobile, Wearable and Ubiquitous Technologies, vol. 4, no. 1, pp. 1-30, 2020, H. Jiang, C. Cai, X. Ma, Y. Yang, and J. Liu, "Smart Home Based on WiFi Sensing: A Survey," IEEE Access, vol. 6, pp. 13317-13325, 2018), device-free surveillance (Z. Li, Z. Tian, M. Zhou, Z. Zhang, and Y. Jin, "An Accurate and Robust Environment Sensing Algorithm for Enhancing Indoor Localization," in Proc. of INFOCOM Workshops, pp. 244-249, IEEE, 2018, F. Wang, J. Feng, Y. Zhao, X. Zhang, S. Zhang, and J. Han, "Joint Activity Recognition and Indoor Localization With WiFi Fingerprints," IEEE Access, vol. 7, pp. 80058-80068, 2019, J. Zhang, B. Wei, W. Hu, and S. S. Kanhere, "Wifi-ID: Human Identification Using WiFi Signal," in 2016 International Conference on Distributed Computing in Sensor Systems (DCOSS), pp. 75-82, IEEE, 2016), activity recognition (C. Li, M. Liu, and Z. Cao, "Wihf: Enable user identified gesture recognition with wifi," in IEEE INFOCOM 2020-IEEE Conference on Computer Communications, pp. 586-595, IEEE, 2020, J. Zhang, F. Wu, B. Wei, Q. Zhang, H. Huang, S. W. Shah, and J. Cheng, "Data Augmentation and Dense-LSTM for Human Activity Recognition Using WiFi Signal," IEEE Internet of Things Journal, vol. 8, no. 6, pp. 4628-4641, 2020, Z. Chen, L. Zhang, C. Jiang, Z. Cao, and W. Cui, "WiFi CSI Based Passive Human Activity Recognition Using Attention Based BLSTM," IEEE Transactions on Mobile Computing, vol. 18, no. 11, pp. 2714-2724, 2018), safety (S. Duan, T. Yu, and J. He, "WiDriver: Driver Activity Recognition System Based on WiFi CSI," International Journal of Wireless Information Networks, vol. 25, no. 2, pp. 146-156, 2018) and healthcare (S. Shi, Y. Xie, M. Li, A. X. Liu, and J. Zhao, "Synthesizing wider wifi bandwidth for respiration rate monitoring in dynamic environments," in IEEE INFOCOM 2019-IEEE Conference on Computer Communications, pp. 181-189, IEEE, 2019, Y. Zeng, D. Wu, J. Xiong, J. Liu, Z. Liu, and D. Zhang; "MultiSense: Enabling Multi-person Respiration Sensing with Commodity WiFi," Proceedings of the ACM on Interactive, Mobile, Wearable and Ubiquitous Technologies, vol. 4, no. 3, pp. 1-29, 2020, Y. Zeng, D. Wu, J. Xiong, E. Yi, R. Gao, and D. Zhang, "FarSense: Pushing the Range Limit of WiFi-based Respiration Sensing with CSI Ratio of Two Antennas," Proceedings of the ACM on Interactive, Mobile, Wearable and Ubiquitous Technologies, vol. 3, no. 3, pp. 1-26, 2019) applications. For a comprehensive survey on the topic, one can refer to (Y. Ma, G. Zhou, and S. Wang, "WiFi Sensing with Channel State Information: A Survey," ACM Computing Surveys (CSUR), vol. 52, no. 3, pp. 1-36, 2019).

WiFi sensing approaches can be categorized into three main groups, (i) received signal strength (RSS), (ii) passive Wi-Fi radar (PWR), and (iii) CSI sensing. RSS sensing is performed through measuring RSS per packet, thus, is a coarse-grained parameter and provides a low-resolution information (L. Yao, Q. Z. Sheng, X. Li, T. Gu, M. Tan, X. Wang, S. Wang, and W. Ruan, "Compressive Representation for Device-free Activity Recognition with Passive RFID Signal Strength," IEEE Transactions on Mobile Computing, vol. 17, no. 2, pp. 293-306, 2017).

Although PWR sensing relies on calculating the difference between transmit and receive signal, its accuracy is highly dependant on the location of the bistatic (W. Li, R. J. Piechocki, K. Woodbridge, C. Tang, and K. Chetty, "Passive WiFi Radar for Human Sensing Using a Stand-alone Access Point," IEEE Transactions on Geoscience and Remote Sensing, vol. 59, no. 3, pp. 1986-1998, 2020). Conversely, thanks to the new methodologies, CSI can be captured in real-time over up to 8 antennas and up to 160 MHz channels for each packet (F. Gringoli, M. Schulz, J. Link, and M. Hollick, "Free Your CSI: A Channel State Information Extraction Platform for Modern Wi-Fi Chipsets," in Proceedings of the 13th International Workshop on Wireless Network Testbeds, Experimental Evaluation & Characterization, pp. 21-28, 2019), which provides fine-grained information in both time and frequency domains.

B. CSI Learning

Deep learning has been proved to be an effective tool for accurate Wi-Fi CSI sensing. To improve the performance of Wi-Fi sensing in terms of accuracy, some approaches have focused on preprocessing and feature extraction (S. Di Domenico, M. De Sanctis, E. Cianca, F. Giuliano, and G. Bianchi, "Exploring Training Options for RF Sensing Using CSI," IEEE Communications Magazine, vol. 56, no. 5, pp. 116-123, 2018, F. Wang, W. Gong, and J. Liu, "On Spatial Diversity in WiFi-based Human Activity Recognition: A Deep Learning-based Approach," IEEE Internet of Things Journal, vol. 6, no. 2, pp. 2035-2047, 2018, S. Di Domenico, G. Pecoraro, E. Cianca, and M. De Sanctis, "Trainedonce Device-free Crowd Counting and Occupancy Estimation using WiFi: A Doppler Spectrum Based Approach," in 2016 IEEE 12th International Conference on Wireless and Mobile Computing, Networking and Communications (WiMob), pp. 1-8, IEEE, 2016, Y. Zhuo, H. Zhu, H. Xue, and S. Chang, "Perceiving Accurate CSI Phases with Commodity WiFi Devices," in Proc. of IEEE Conference on Computer Communications (INFOCOM), pp. 1-9, 2017), while others applied more sophisticated machine learning (ML) models (Z. Shi, J. A. Zhang, Y. D. R. Xu, and Q. Cheng, "Environment-Robust Device-free Human Activity Recognition with Channel-State Information Enhancement and One-Shot Learning," IEEE Transactions on Mobile Computing, 2020, Z. Chen, L. Zhang, C. Jiang, Z. Cao, and W. Cui, "WiFi CSI Based Passive Human Activity Recognition Using Attention Based BLSTM," IEEE Transactions on Mobile Computing, vol. 18, no. 11, pp. 2714-2724, 2018, Y. Ma, S. Arshad, S. Muniraju, E. Torkildson, E. Rantala, K. Doppler, and G. Zhou, "Location- and Person-Independent Activity Recognition with WiFi, Deep Neural Networks, and Reinforcement Learning," ACM Transactions on Internet of Things, vol. 2, no. 1, pp. 1-25, 2021, C. Xiao, D. Han, Y. Ma, and Z. Qin, "CsiGAN: Robust Channel State Information-based Activity Recognition with GANs," IEEE Internet of Things Journal, vol. 6, no. 6, pp. 10191-10204, 2019). However, most of these approaches are unable to generalize and their performance deteriorates when tested in an unseen environment (Z. Chen, L. Zhang, C. Jiang, Z. Cao, and W. Cui, "WiFi CSI Based Passive Human Activity Recognition Using Attention Based BLSTM," IEEE Transactions on Mobile Computing, vol. 18, no. 11, pp. 2714-2724, 2018). Commercial CSI sensing methods are trained offline and the source model is expected to be adapted to target environments rapidly given a limited number of samples. To this end, generalizing the model to different environments is a useful factor for the success of Wi-Fi sensing.

A very limited number of existing papers have focused on this aspect of CSI sensing (Z. Shi, J. A. Zhang, Y. D. R. Xu, and Q. Cheng, "Environment-Robust Device-free Human Activity Recognition with Channel-State Information Enhancement and One-Shot Learning," IEEE Transactions on Mobile Computing, 2020, C. Xiao, D. Han, Y. Ma, and Z. Qin, "CsiGAN: Robust Channel State Information-based Activity Recognition with GANs," IEEE Internet of Things Journal, vol. 6, no. 6, pp. 10191-10204, 2019, J. Zhang, Z. Tang, M. Li, D. Fang, P. Nurmi, and Z. Wang, "Crosssense: Towards cross-site and large-scale wifi sensing," in Proceedings of the 24th Annual International Conference on Mobile Computing and Networking, pp. 305-320, 2018, Y. Zheng, Y. Zhang, K. Qian, G. Zhang, Y. Liu, C. Wu, and Z. Yang, "Zero-effort cross-domain gesture recognition with wi-fi," in Proceedings of the 17th Annual International Conference on Mobile Systems, Applications, and Services, pp. 313-325, 2019).

Authors in (Z. Chen, L. Zhang, C. Jiang, Z. Cao, and W. Cui, "WiFi CSI Based Passive Human Activity Recognition Using Attention Based BLSTM," IEEE Transactions on Mobile Computing, vol. 18, no. 11, pp. 2714-2724, 2018) generalize to a broader range of features by designing a very sophisticated deep learning method using attention-based bi-directional long short-term memory (ABLSTM) to extract significant sequential features from raw CSI measurement. To generalize to new users, CsiGAN in (C. Xiao, D. Han, Y. Ma, and Z. Qin, "CsiGAN: Robust Channel State Information-based Activity Recognition with GANs," IEEE Internet of Things Journal, vol. 6, no. 6, pp. 10191-10204, 2019) leverages generative adversarial network (GAN) to generate artificial examples to account for the left-out user whose CSI data is not available in the training examples of the deep learning model. Although these frameworks successfully improved the accuracy of predictions, despite their computationally intensive training procedure, they fall short when it comes to generalizing to new environments. For example, as attested in (Z. Chen, L. Zhang, C. Jiang, Z. Cao, and W. Cui, "WiFi CSI Based Passive Human Activity Recognition Using Attention Based BLSTM," IEEE Transactions on Mobile Computing, vol. 18, no. 11, pp. 2714-2724, 2018), the accuracy of the model reduces to 32% when tested in an untrained environment.

Recent work (J. Zhang, Z. Tang, M. Li, D. Fang, P. Nurmi, and Z. Wang, "Crosssense: Towards cross-site and large-scale wifi sensing," in Proceedings of the 24th Annual International Conference on Mobile Computing and Networking, pp. 305-320, 2018) implemented transfer learning to generate an environment-independent model by translating knowledge from the source to test environments. The authors in (Y. Zheng, Y. Zhang, K. Qian, G. Zhang, Y. Liu, C. Wu, and Z. Yang, "Zero-effort cross-domain gesture recognition with wi-fi," in Proceedings of the 17th Annual International Conference on Mobile Systems, Applications, and Services, pp. 313-325, 2019) suggested extracting the power distribution of different gesture's velocities from the Doppler spectrum. Then, a temporal learning model is applied to learn the extracted features and perform domain-independent gesture recognition. However, these approaches require extensive data pre-processing, careful feature extraction, and an abundance of training examples. For example, experimental results in (Y. Zheng, Y. Zhang, K. Qian, G. Zhang, Y. Liu, C. Wu, and Z. Yang, "Zero-effort cross-domain gesture recognition with wi-fi," in Proceedings of the 17th Annual International Conference on Mobile Systems, Applications, and Services, pp. 313-325, 2019) show that the accuracy of the method drops significantly when the number of human subjects and training samples decreases.

Conversely, few-shot learning (FSL) is a ML technique that has shown remarkable results in generalizing from a few examples and classifying examples from previously unseen classes given only a handful of training data. Thanks to this unique feature, FSL can be an exceptional candidate for CSI learning problems. A recent work (Z. Shi, J. A. Zhang, Y. D. R. Xu, and Q. Cheng, "Environment-Robust Device-free Human Activity Recognition with Channel-State Information Enhancement and One-Shot Learning," IEEE Transactions on Mobile Computing, 2020) addresses human activity recognition through FSL. A CSI feature extraction method along with a matching network (MatNet) (O. Vinyals, C. Blundell, T. Lillicrap, D. Wierstra, et al., "Matching Networks for One Shot Learning," Advances in Neural Information Processing Systems, vol. 29, pp. 3630-3638, 2016) is used to remove the environment-dependent data and to make accurate predictions in new environments. However, MatNets require designing application-dependent embedding functions, through long short-term memory (LSTM) and attention-based LSTM networks. This adds to the computational complexity of the method and limits its generalizability to only certain applications. To address these challenges, an example embodiment may employ a prototypical network (ProtoNet) (J. Snell, K. Swersky, and R. S. Zemel, "Prototypical Networks for FewShot Learning," arXiv preprint arXiv: 1703.05175, 2017), which (i) achieves the same level of performance with less complexity, and (ii) can be generalized to a variety of CSI sensing applications.

C. CSI Collection and Datasets Availability

Reliable and high-resolution CSI datasets are key enablers of any learning-based CSI sensing application. In Wi-Fi, CSI data can be estimated at the receiver over all subcarriers through pilot symbols contained in the physical layer (PHY) preamble. Being computed at the PHY, CSI is not accessible by the end-user through normal network interface cards (NICs), which makes CSI acquisition a challenging task. Some software-defined radio (SDR) Wi-Fi implementations do exist (B. Bloessl, M. Segata, C. Sommer, and F. Dressler, "An IEEE 802.11 a/g/p OFDM Receiver for GNU Radio," in Proc. of the Second Workshop on Software Radio Implementation Forum, pp. 9-16, 2013), but to the best of our knowledge, they are limited to 20 MHz bandwidth only (IEEE 802.11 a/g/p). For this reason, the majority of research works have used 802.11g and 802.11n standards for data collection, which limits the total bandwidth to 40 MHz (Y. Xie, Z. Li, and M. Li, "Precise Power Delay Profiling with Commodity Wi-Fi," IEEE Transactions on Mobile Computing, vol. 18, no. 6, pp. 1342-1355, 2018). To address this shortcoming, an example embodiment may leverage the recently released Nexmon CSI-extractor tool (F. Gringoli, M. Schulz, J. Link, and M. Hollick, "Free Your CSI: A Channel State Information Extraction Platform for Modern Wi-Fi Chipsets," in Proceedings of the 13th International Workshop on Wireless Network Testbeds, Experimental Evaluation & Characterization, pp. 21-28, 2019) to obtain CSI from IEEE 802.11ac transmissions at 80 MHz of bandwidth. By leveraging Multiple Input, Multiple Output (MIMO), CSI was collected with four receiver antennas. Section V, further below, discloses that increasing the number of antennas, receivers, and subcarriers over which the CSI data is measured, increases the CSI sensing performance significantly:

As understood, only a few CSI sensing datasets are publicly available. FalldeFi (S. Palipana, D. Rojas, P. Agrawal, and D. Pesch, "FallDeFi: Ubiquitous Fall Detection Using Commodity Wi-Fi Devices," Proceedings of the ACM on Interactive, Mobile, Wearable and Ubiquitous Technologies, vol. 1, no. 4, pp. 1-25, 2018) is a fall detection dataset consisting of information collected in 6 rooms. human activity recognition (HAR) dataset is collected in (S. Yousefi, H. Narui, S. Dayal, S. Ermon, and S. Valaee, "A Survey on Behavior Recognition Using WiFi Channel State Information," IEEE Communications Magazine, vol. 55, no. 10, pp. 98-104, 2017) and (L. Guo, L. Wang, C. Lin, J. Liu, B. Lu, J. Fang, Z. Liu, Z. Shan, J. Yang, and S. Guo, "Wiar: A Public Dataset for WiFi-based Activity Recognition," IEEE Access, vol. 7, pp. 154935-154945, 2019) where measurements are collected inside 1 and 3 rooms, respectively. In all cases, 1 transmitter and 1 receiver are utilized. The size of each instance in all datasets is (2000, 3, 30), representing 2000 CSI matrices with three receive antennas and 30 subcarriers measured in two seconds. Disclosed herein, for the first time, a large-scale dataset is collected that contains multiantenna (up to 4) multi-receiver (up to 3) fine-grained (up to 242 subcarriers) CSI readings from multiple environments and activities.

III. The ReWiS Framework

This section describes an example embodiment of the ReWiS framework for robust CSI sensing. For non-limiting example, the framework's core focus is on (i) reducing the cost of data acquisition and labeling by adopting customized ProtoNet to learn and generalize with limited data; and (ii) reducing the complexity of the learning method and data pre-processing while maintaining the accuracy by collecting data over multiple antennas, multiple receivers at different locations and high-resolution CSI data over large channel bandwidth. First, the core design principles are explained in Section III-A. Then, in Section III-B, the ReWis CSI processing procedure is described. Finally, an example embodiment of a FSL-based technique for robust CSI learning is disclosed in Section II-B.

A. ReWiS Robust Design Principles

The ReWiS is a passive sensing system leveraging CSI data computed through listening to ongoing traffic exchange between Wi-Fi devices. The key motivation behind the ReWiS is that the accuracy of the CSI computation depends on the coherence time of the channel, the received power of the transmitted signal, interference from other transmissions and background noise, among other factors. For this reason, the ReWiS leverages multiple receivers and multiple antennas to collect robust CSI data and thus increases the accuracy. The impact of each factor in increasing the accuracy of CSI sensing is detailed below.

(1) Spatial diversity. Due to the presence of multiple reflectors and scatterers in indoor environments, there is a significant probability that the communication channel is in a deep fade and, thus, that the CSI measurement may be erroneous. This provided motivation for an example embodiment to increase the reliability of the CSI sensing framework through adding spatial diversity. Without any control over the final configuration of Access Points (APs) in a target environment, it is useful to ensure that Orthogonal Frequency Division Multiplexing (OFDM) symbols for CSI estimation passes through multiple signal paths, each of which fades independently, guaranteeing that reliable CSI measurement is possible even if some paths are in a deep fade. Therefore, in ReWiS, two types of diversity, namely, macro-diversity and micro-diversity are incorporated.

(a) Micro-diversity. An example embodiment of ReWiS improves performance by collecting CSI data with multiple receive antennas. As long as the antennas are placed sufficiently far apart, this would create independent propagation paths between different antenna pairs, thus reducing the chance of deep fade significantly. In indoor environments, the channel decorrelates over shorter spatial distances (D. Tse and P. Viswanath, Fundamentals of Wireless Communication. Cambridge university press, 2005), and the typical Wi-Fi router's antenna separation of the half to one carrier wavelength is sufficient (about 3-6 cm at 5 GHz band). To make ReWiS compatible with legacy Wi-Fi systems, an example embodiment leverages one spatial stream and uses the full diversity on the receiving side by activating four receive antennas. Experimental results are shown in table 900 of FIG. 9, disclosed further below, which shows that micro-diversity helps increase classification accuracy by up to 16% with respect to a single-antenna system, as micro-diversity improves robustness to multi-path fading and interference.

(b) Macro-diversity. An example embodiment of ReWiS leverages the usage of multiple receivers to further improve diversity. Indeed, modern indoor Wi-Fi networks commonly leverage multiple APs to increase the wireless range, boost coverage, ensure reliability and support a large number of wireless applications/devices. Thus, an example embodiment of ReWiS may collect CSI simultaneously from multiple receivers. The experimental results in table. 900 show that macro-diversity improves the prediction accuracy by 38% with respect to a single-receiver system, as the receivers are located several wavelengths apart from each other. On the other hand, macro-diversity implies that the data from multiple receivers must be aligned both in time and frequency domains.

(2) Time diversity. The Wi-Fi propagation environment is subject to almost continuous change, mainly owing to the movement of obstacles between the transmitter and the receiver, as well as the presence of noise and interference from overlapping channels. For this reason, to improve robustness, an example embodiment of ReWiS leverages the usage of multiple, subsequent CSI readings to boost the classification accuracy. To compensate for the increase in complexity, an example embodiment may use a novel and custom-tailored technique based on singular value decomposition (SVD), which is explained in Section III-B (Step 4: Dimension reduction). As disclosed herein, such a technique helps reduce the input size by about 80%. Moreover, by trading off delay for accuracy (the more CSI readings, the more delay), an example embodiment of the ReWiS CSI dataset preparation and dataset construction disclosed further below with regard to FIG. 4 employs time diversity that increases accuracy by up to 35%, as the number of CSI readings fed to the learning model help counteract the adverse channel conditions.

(3) Subcarrier resolution. CSI measurement at low channel bandwidth cannot resolve multipath propagations and, thus, limits many CSI sensing applications that require higher precision (S. Shi, Y. Xie, M. Li, A. X. Liu, and J. Zhao, "Synthesizing wider wifi bandwidth for respiration rate monitoring in dynamic environments," in IEEE INFOCOM 2019-IEEE Conference on Computer Communications, pp. 181-189, IEEE, 2019, J. Xiong, K. Sundaresan, and K. Jamieson, "Tonetrack: Leveraging Frequency-agile Radios for Time-based Indoor Wireless Localization," in Proc. of the 21st Annual International Conference on Mobile Computing and Networking, pp. 537-549, 2015). Inevitably, either feature extraction methods have been utilized or sampling frequency has been increased, to compensate for the low resolution in the frequency domain. In order to avoid time- and computational-intensive data pre-processing for complex feature extraction and efficient sampling, an example embodiment may employ the Nexmon tool (F. Gringoli, M. Schulz, J. Link, and M. Hollick, "Free Your CSI: A Channel State Information Extraction Platform for Modern Wi-Fi Chipsets," in Proceedings of the 13th International Workshop on Wireless Network Testbeds, Experimental Evaluation & Characterization, pp. 21-28, 2019) to extract high-resolution 802.11ac CSI data over the 80 MHz wide channel with 242 subcarriers. The results in FIGS. 10A-D and FIGS. 11A-D, disclosed further below, show that using higher subcarrier resolution improves prediction accuracy by up to 19%, as finer-grained CSI data is fed to the learning model.

B. ReWiS CSI Processing

An example embodiment of the procedure ReWiS disclosed herein converts the unprocessed CSI measurements into a dataset used as the input of the ML method. Such processing may be referred to herein as CSI data preparation, and is depicted in FIG. 4, disclosed below.

Figure 4:
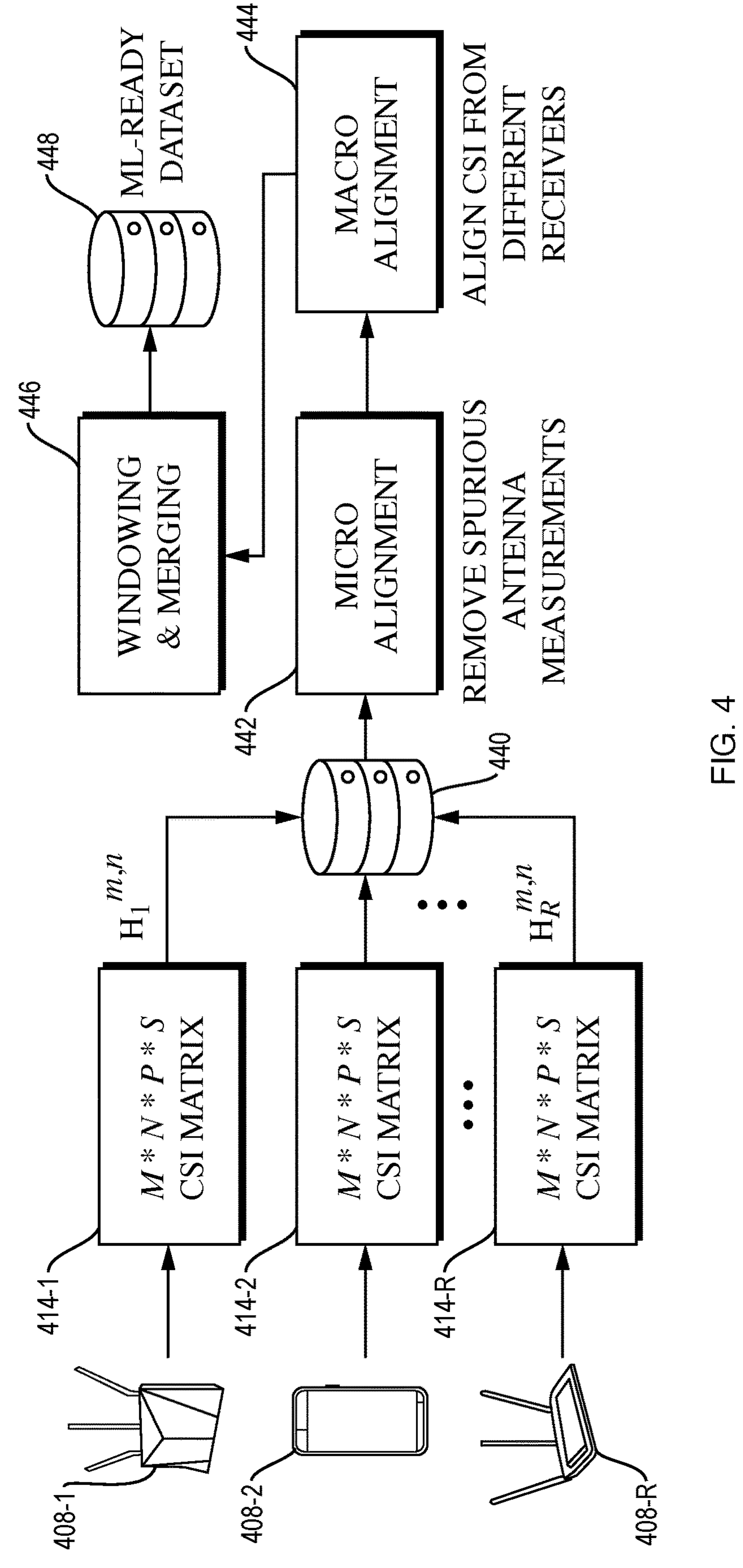
FIG. 4 is a block diagram of an example embodiment of ReWiS channel state information (CSI) dataset preparation and dataset construction.

FIG. 4 is a block diagram 400 of an example embodiment of ReWiS channel state information (CSI) dataset preparation and dataset construction. As explained earlier, an example embodiment of ReWiS may leverage multiple receivers (408-1, 408-2, . . . , 408-R) with multiple antennas, as well as fine-grained CSI estimated by the Wi-Fi OFDM receiver. In an OFDM system, the digital data stream is modulated over multiple overlapping, closely spaced orthogonal subcarrier to transmit data in parallel. Let us assume P packets are captured during the data collection campaign. In a M×N MIMO OFDM system with M transmit antennas, N receive antennas and S subcarriers, the extracted CSI matrix (414-1, 414-2, . . . , 414-R) between the transmit antenna m and the receive antenna n located on receiver r can be written as $$H_r^{m,n} = \begin{bmatrix} h_{1,1}^{m,n} & \dots & h_{1,s}^{m,n} & \dots & h_{1,S}^{m,n} \\ \vdots & & \vdots & & \vdots \\ h_{p,1}^{m,n} & \dots & h_{p,s}^{m,n} & \dots & h_{p,S}^{m,n} \\ \vdots & \ddots & \vdots & \ddots & \vdots \\ h_{P,1}^{m,n} & \dots & h_{P,s}^{m,n} & \dots & h_{P,S}^{m,n} \end{bmatrix}, \begin{matrix} 1 \le n \le N \\ 1 \le m \le \cdot M \end{matrix}$$

where the element $$h_{p,s}^{m,n}$$

denotes the amplitude and phase information of the CSI obtained from p-th packet, the s-th OFDM subcarrier over the channel from the transmitter m to the receiver n. For example, when P=100 and 80 MHz channels, the matrices $$H_r^{m,n}$$

have P×S=100·242 elements for non-limiting example.

Step 1. Micro alignment 442. During the experiments, it was noticed that in some instances, CSI packets are not captured by all antennas. In that case, those CSI measurements are identified and removed from the dataset 440.

Step 2. Macro alignment 444. In addition to antenna-level alignment, the data collected from different receivers is aligned to ensure that each CSI element collected over different receivers represents the same time and frequency domain channel measurements. To this end, the Wi-Fi sequence number is used to match data from different receivers.

Step 3. Segmentation and integration (not shown). At this step, first, to remove noise and unwanted amplification, the CSI elements are normalized by the mean amplitude over all subcarriers. Next, the CSI measurements from each antenna, $$H_r^{m,n}$$

is divided into fixed-size data-segments by sliding a non-overlapping window through the time-domain measurements. The data-segments, denoted by $$\hat{H}_r^{m,n},$$

are matrices of dimension W×S, where Wis the number of OFDM packets in a window. Further, measurements from all antennas on the same receiver are integrated along time domain, into one matrix to form a data-frame as $$H_r = \begin{bmatrix} \hat{H}_r^{m,1} \\ \dots \\ \hat{H}_r^{m,N} \end{bmatrix} \quad (1)$$

where data-frame $$H_r = H_r^A e^{jH_r^\phi}$$

is a complex matrix. Note that the transmit antenna index m is omitted in the interest of readability. Moreover, both amplitude matrix $$H_r^A = \|H_r\|$$

and phase matrix $$H_r^\phi = \measuredangle H_r$$

can be utilized for CSI sensing individually. For notation brevity, from here on, $H_r$ is a real matrix representing both $$H_r^A$$

and $$H_r^\phi$$

matrices.

Step 4. Dimension reduction may be performed as part of windowing and merging 446. Data-frames with size N·W×S may be too large to be fed into the learning module. To improve the performance and processing time of the learning method, data-frames are minimally preprocessed with singular value decomposition (SVD), which is a powerful tool to eliminate the less important variables of large-size data matrices and produce an approximation with lower dimensions. To preserve the subcarrier resolution, an example embodiment may only reduce the number of features in the time domain, i.e., CSI packets. By using SVD, the data-frame matrix in (1) is factored into the product of three matrices as $$H_r^T = U\Sigma V^T,$$

where diagonal values of Σ contains the singular values of the data-frame and U and V are known as the left- and right-singular vectors.

The key to understanding SVD functionality is that by multiplying $$H_r^T$$

with the left-singular vector V, time-domain measurements over each subcarrier is mapped to the subcarrier space, to preserve only the useful packets over each subcarrier. Using eigenvalue analysis, it was noticed that singular value contributions of the data-frames depends on the type of activity and the environment. Hence, an example embodiment may utilize all singular values to maintain the ReWiS generalizability. The compact data-frame, H' with dimension S×S is calculated as $$H_r' = H_r^T \times V. \tag{2}$$

Further, to extract more features from the compact data-frame, the linear correlation among subcarriers are extracted simply by calculating the Pearson Correlation Coefficient (PCC) of the compact data-frame (J. Han, J. Pei, and M. Kamber, Data Mining: Concepts and Techniques. Elsevier, 2011). These correlation matrices, denoted as ρH with dimension S×S, are the input of the ReWiS learning module and may represent a ML-ready dataset 448. Therefore, an example embodiment is able to reduce the dimensionality from N·W·S to S·S, which makes the input constant with the window size and the number of receiver antennas. For example, with experiments using 4 antennas and a window size of up to 300, the input size was reduced by about 80%.

C. ReWis Learning Models

Preliminaries about the FSL and related models are described in this section. Then, an example embodiment of the ReWis CSI learning procedure is presented.

FSL and ProtoNet. Traditionally, supervised learning approaches require a large labeled dataset for training. In applications such as activity recognition, collecting and labeling large datasets may be challenging, thus the labeled data is severely limited (C. Xiao, D. Han, Y. Ma, and Z. Qin, "CsiGAN: Robust Channel State Information-based Activity Recognition with GANs," IEEE Internet of Things Journal, vol. 6, no. 6, pp. 10191-10204, 2019). For this reason, an example embodiment of ReWiS may use few-shot learning (FSL), where the objective is to quickly adapt to new/unseen data given a limited number of samples. The purpose of FSL is to train a model with high accuracy when the data of the target task is small by using some kind of prior knowledge. In practice, FSL is useful when training examples are hard to find, or the cost of labeling is high (O. Vinyals, C. Blundell, T. Lillicrap, D. Wierstra, et al., "Matching Networks for One Shot Learning," Advances in Neural Information Processing Systems, vol. 29, pp. 3630-3638, 2016).

Specifically, in K-way-N-shot learning, the model is trained through a set of sampled mini-batches of classes and data points, called training tasks. Each task is divided into a query set and a limited support set with K different classes and N labeled examples (shots) of each class (typically 1-5). The small training set requires the fast adaptability of the model. The query set is classified using the knowledge from the support set. The performance of the model in generalizing to new classes is evaluated by the average test accuracy across many K-way-N-shot test tasks containing unseen/new classes. In a nutshell, by learning a generalizable metric space, FSL learns how to classify given a set of training tasks, and exploit this knowledge to classify new classes. It is worth noting that in CSI sensing applications a new environment can be interpreted as a new class. To illustrate this point, FIGS. 5A-C, described below, show CSI measurements of empty rooms in 3 different environments. Although all three are labeled as empty room, it can be seen that they show distinct patterns due to the unique propagation profile of each environment.

Figures 5A, 5B, 5C:
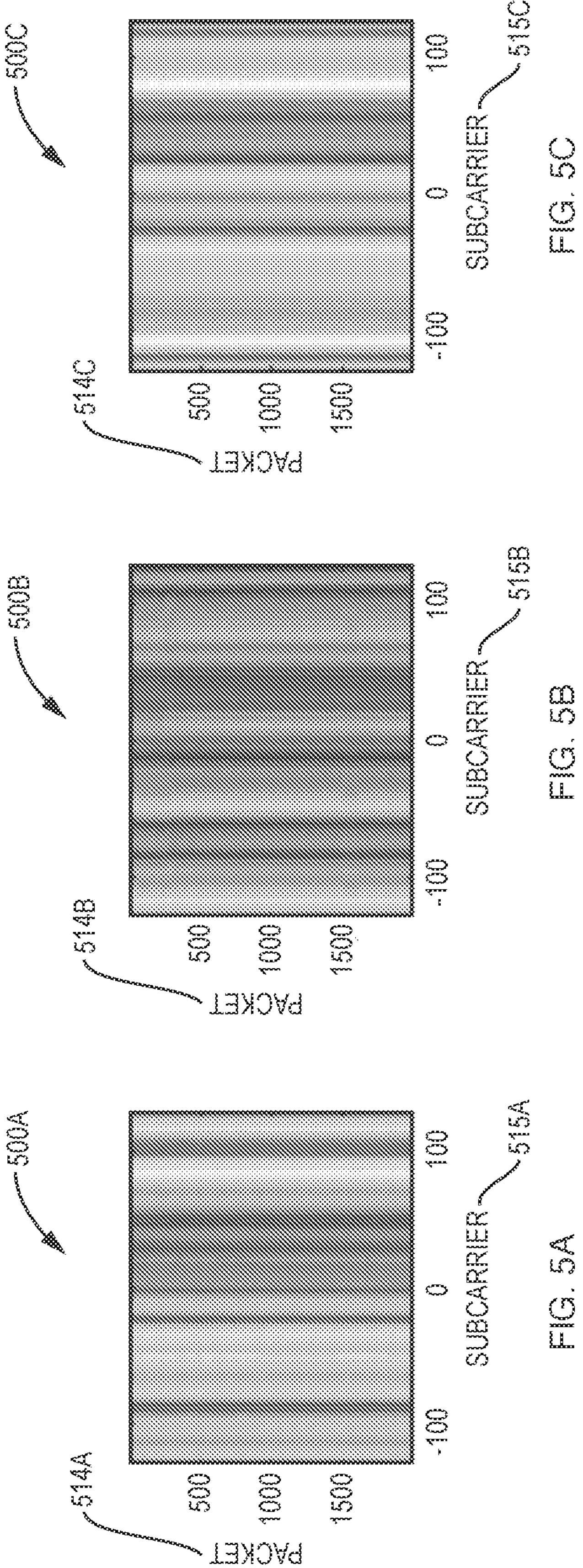
FIGS. 5A-C are plots of example embodiments of CSI measurements of an empty room in the data collection environments described in FIGS. 7A-C.

FIG. 5A is a plot of an example embodiment of CSI measurements 500A of an empty room in the data collection environment 1 ($E_1$), also referred to as E1, of FIG. 7A disclosed further below. The CSI measurements 500A correspond to a CSI packet 514A and subcarrier 515A.

FIG. 5B is a plot of an example embodiment of CSI measurements 500B of an empty room in the data collection environment 2 ($E_2$), also referred to as E2, of FIG. 7B disclosed further below. The CSI measurements 500B correspond to a CSI packet 514B and subcarrier 515B.

FIG. 5C is a plot of an example embodiment of CSI measurements 500C of an empty room in the data collection environment 3 ($E_3$), also referred to as E3, of FIG. 7C disclosed further below. The CSI measurements 500C correspond to a CSI packet 514C and subcarrier 515C.

Different FSL approaches, such as MatNet (O. Vinyals, C. Blundell, T. Lillicrap, D. Wierstra, et al., "Matching Networks for One Shot Learning," Advances in Neural Information Processing Systems, vol. 29, pp. 3630-3638, 2016), metalearning (S. Ravi and H. Larochelle, "Optimization as a Model for Few-Shot Learning," 2016) and ProtoNet (J. Snell, K. Swersky, and R. S. Zemel, "Prototypical Networks for FewShot Learning," arXiv preprint arXiv: 1703.05175, 2017), propose different metric spaces in which classification can be performed. Among these methods, ProtoNet applies a simple yet effective inductive bias in the form of class prototypes that leads to achieving impressive few-shot performance and reducing the network complexity. Next, the fundamentals of the ProtoNets are explained briefly.

ProtoNet model. During e-th training episode, a training task comprising a mini-batch of classes and data points are sampled as $T_e=\{D_1, \ldots, D_K\}$. $D_k=\{(x_i,y_i)|y_i=k\}$ denotes the set of data points labeled with class k, where each $x_i$ is a data point and $y_1 \in \{1, \ldots, K\}$ is the corresponding label. Next, $T_e$ is further divided into support and query sets, i.e., $T_e=\{S_e, Q_e\}$. A subset of each class set, $D_k$ with N instances is selected as the support set: $S_e= \{(s_1,y_1), \ldots, (s_N,y_1), \ldots, (s_N,y_K)\}$ and the rest of the examples are used as the query set, $Q_e=\{(q_1,y_1), \ldots, (q_L,y_1), \ldots, (q_L,y_K)\}$ where L is the number of samples in the query set.

Figure 6:
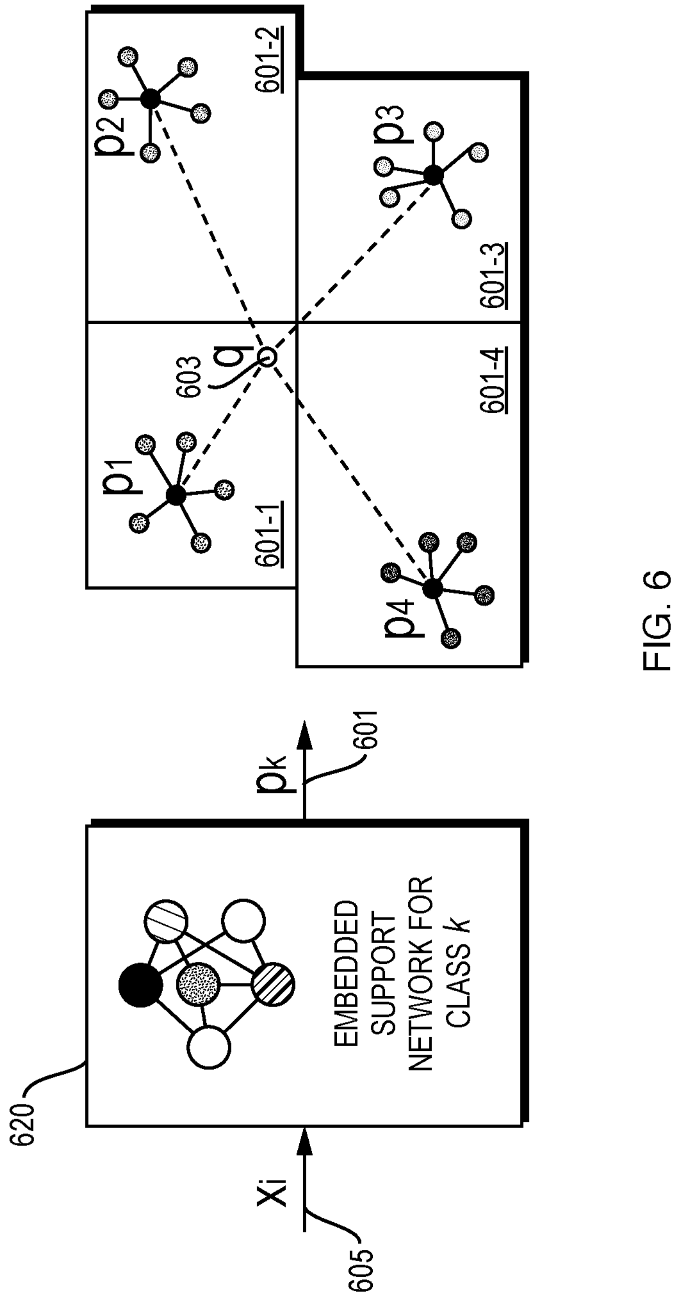
FIG. 6 is a schematic diagram of an example embodiment of an embedded prototype network.

To avoid suffering from high variance caused by high dimensionality of the $x_i$, the support and query data are mapped into a feature space by embedding function $f_\theta(x_i)$ with cleanable parameters θ as shown in FIG. 6, described below. Learning a proper embedding model is a paramount task (Y. Tian, Y. Wang, D. Krishnan, J. B. Tenenbaum, and P. Isola, "Rethinking Few-Shot Image Classification: A Good Embedding Is All You Need?," in Proc. of European Conference on Computer Vision (ECCV), pp. 266-282, Springer, 2020) that will be discussed later in-depth in this section.

FIG. 6 is schematic diagram of an example embodiment of an embedded prototype network 620. The principle idea behind ProtoNet is that data points cluster around a single prototype representation for each class that is simply the mean of the embedded support samples of each class (J. Snell, K. Swersky, and R. S. Zemel, "Prototypical Networks for FewShot Learning," ar Xiv preprint arXiv: 1703.05175, 2017). Therefore, the prototype of each class, $p_k$ 601, is computed as $$p_k = \frac{1}{|\mathcal{D}_k|} \cdot \sum_{(s_i,y_k)\in D_k} f_\phi(s_i) \tag{3}$$

These prototypes (601-1, 601-2, 601-3, 601-4) can be used to classify the query samples, as illustrated in FIG. 6.

For a query point q 603, the ProtoNet produces a distribution over classes using a softmax over distances to the prototypes in the embedding space as $$\mathcal{L}(Q_e) = \frac{-1}{|Q_e|} \sum_{(q_i, y_i) \in Q_e} \log\left(\frac{\exp(-\|f_\theta(q_i) - p_k\|^2)}{\sum_{k'} \exp(-\|f_\theta(q_i) - p_{k'}\|^2)}\right). \tag{4}$$

The ProtoNet is trained through minimizing the loss function via stochastic gradient descend (SGD) over training episodes. At test time, sample $x_i$ 605 is classified using the nearest neighboring prototype computed from the support set of the test episode as $y(x_i) = \arg\min_{j \in \{1, \ldots, K\}} \|x_i - p_j\|^2$.

It is worth noting that ReWiS adopts Euclidean distance rather than cosine similarity used in (Z. Shi, J. A. Zhang, Y. D. R. Xu, and Q. Cheng, "Environment-Robust Device-free Human Activity Recognition with Channel-State Information Enhancement and One-Shot Learning," IEEE Transactions on Mobile Computing, 2020) as it is shown through extensive experiments that it outperforms other distance metrics (J. Snell, K. Swersky, and R. S. Zemel, "Prototypical Networks for FewShot Learning," arXiv preprint arXiv: 1703.05175, 2017).

Learning embedding model $f_\theta$. The ProtoNet's goal is to learn a transferable embedding that generalizes to new tasks. Previous work (Z. Shi, J. A. Zhang, Y. D. R. Xu, and Q. Cheng, "Environment-Robust Device-free Human Activity Recognition with Channel-State Information Enhancement and One-Shot Learning," IEEE Transactions on Mobile Computing, 2020) has adopted a MatNet and employed two distinct deep neural networks (DNNs) for query samples and support samples. In addition, attention-based LSTM is used to encode a full context embedding of support samples.

Unlike (Z. Shi, J. A. Zhang, Y. D. R. Xu, and Q. Cheng, "Environment-Robust Device-free Human Activity Recognition with Channel-State Information Enhancement and One-Shot Learning," IEEE Transactions on Mobile Computing, 2020), an example embodiment uses only one embedding function for both support and query sets rather than multiple embedding functions. This reduces the number of hyper-parameters, simplifying the learning process of CSI sensing and reducing the time- and computational-complexity.

In addition, learning the embeddings according to the dataset makes ReWiS application independent. In view of (Y. Tian, Y. Wang, D. Krishnan, J. B. Tenenbaum, and P. Isola, "Rethinking Few-Shot Image Classification: A Good Embedding Is All You Need?," in Proc. of European Conference on Computer Vision (ECCV), pp. 266-282, Springer, 2020), ReWiS learns the embedding function feby training a neural network on the entire training set, i.e., an example embodiment may merge all the support mini-batches into a single set as $S = \cup\{S_1, \ldots, S_e, \ldots, S_E\}$, where E is the total number of training tasks. The embedding model parameters may then be achieved by $$\theta = \arg\min_\theta \mathcal{L}^{ce}(\mathcal{S}; \theta), \tag{5}$$

where $\mathcal{L}^{ce}$ denotes the cross-entropy loss between predictions and ground-truth labels.

D. ReWiS Training and Inference

ReWiS learns from the training dataset collected in the source environment to perform the related CSI sensing application in the target environment. The dataset of each receiver r includes CSI data-frames of size S×S and corresponding labels, as explained in Section III-B. Using these datasets, a learning model is trained for each receiver. The training dataset is sampled into mini-batches of training and testing tasks. Each task includes a support and a query set of K classes and N examples (shots) as explained in Section III-C.

Training. For non-limiting example, first, the support mini-batches are fed into an embedding learning module to train a proper embedding function. The embedding is trained using a convolutional neural network (CNN) with four convolutional blocks. Each block comprises a 64-filter 3×3 convolution, batch normalization layer (S. Ioffe and C. Szegedy, "Batch Normalization: Accelerating Deep Network Training by Reducing Internal Covariate Shift," in Proc. of International Conference on Machine Learning (ICML), pp. 448-456, PMLR, 2015), a ReLU nonlinearity, and a 2×2 max-pooling layer is applied after each of the blocks. Finally, and a global average-pooling layer is on top of the fourth block to generate the feature embedding. All of the models were trained via SGD optimizer with Adam (D. P. Kingma and J. Ba, "Adam: A Method for Stochastic Optimization," arXiv preprint arXiv: 1412.6980, 2014). The learning rate is initialized as 10.3 and is cut in half every 2000 episodes. Following learning the proper embedding model, the learning proceeds by minimizing the loss function in (4), disclosed above.

Testing. During testing time, the method only requires N samples (also called shots) of the desired activities to function in the target environment. In a real-world scenario, this can be realized through a mobile application installed on the end user's phone. As a part of the initialization process, the user is asked to perform some activities for a short amount of time (less than a minute) and label the activities. The learning method utilizes the provided labeled data by the user as the support set of the testing task and adapts to the target environment. As explained earlier, there exists a trained model per receiver. At testing time, each model returns a probability distribution vector over all classes as $P_r = [p_1, \ldots, p_k]$. By R defining as the number of receivers, the final decision on the label of a data point y is made through superposition of all probability vectors and finding the maxima $$y = \arg\max_k \sum_{r=1}^{R} P_r.$$

IV. Prototype and Experimental Data Collection

To demonstrate the robustness of ReWiS in generalizing to new environments, an example embodiment of a testbed was designed with commercially available off-the-shelf Wi-Fi devices. The performance of ReWiS was evaluated by building a prototype and analyzing a use-case application of CSI sensing, i.e., human activity recognition (HAR). First, an example embodiment of the evaluation methodology is presented, including environment setup, measurement tools, data collection campaigns and training/testing procedure. Then, the results obtained are presented which investigate the following aspects:

1) The impact of macro-, micro-diversity, and subcarrier resolution on the accuracy of ReWiS predictions.
2) The role of ProtoNet in enabling ReWiS generalizing to unseen environments.

For non-limiting example, an example embodiment considers four activities, namely empty room, walking, jumping, and standing. Each of these cases has its own specific challenges. Notice that even identifying an empty room is not a trivial task, as changes in environment/time of experiment lead to significant alterations in the CSI measurements as shown in FIGS. 5A-C, disclosed above. The implementation of the ReWiS prototype employs a pair of Wi-Fi transmitter-receiver to establish a traffic link, in addition to a set of Wi-Fi routers equipped with an extraction tool to process the CSI data. In the following, example embodiments of the ReWiS components are detailed as well as the experiment setup.

A. CSI Extraction, Hardware and Testbed Setup

The Nexmon CSI tool (F. Gringoli, M. Schulz, J. Link, and M. Hollick, "Free Your CSI: A Channel State Information Extraction Platform for Modern Wi-Fi Chipsets," in Proceedings of the 13th International Workshop on Wireless Network Testbeds, Experimental Evaluation & Characterization, pp. 21-28, 2019) was used, the state-of-the-art CSI extraction tool to collect CSI measurements using Asus RTAC86U Wi-Fi routers. In a real-world scenario, an example embodiment of ReWiS may rely on already existing Wi-Fi transmissions. In a controlled experiment, however, a pair of transmitter-receiver were dedicated to emulate the traffic generation. To establish the Wi-Fi link, a Netgear R7800 Wi-Fi router with a Qualcomm Atheros chipset was used in AP, mode. An off-the-shelf laptop acted as the client. The hostapd tool (R. Rosen, "Linux Wireless-Linux Kernel Networking (4)-Advanced Topics," 2009) was utilized on the AP to ensure that the traffic was generated using 802.11ac at the desired bandwidth. UDP packets between the AP and the client were generated with a rate of 1 Mbit/s via iperf3 tool (M. Mortimer, "iperf3 Documentation," 2018) and transmitted through a single spatial stream.

To implement an example embodiment of the prototype ReWiS, 3 Asus RT-AC86U WiFi routers were used, each equipped with N=4 antennas. The Asus routers extracted the CSI packets using the Nexmon firmware, by computing the CSI on the UDP frames transmitted from the AP to the client. CSI was computed at a rate of 100 Hz. The Nexmon tool enabled collection of 802.11ac channel measurements at 5 GHz with 20 and 80 MHz bandwidth over S=52 and S=242 subcarriers. The measurement at 20 MHz was used to evaluate the effectiveness of higher subcarrier resolutions as compared with legacy CSI measurements. Note that originally 802.11ac 20 MHz and 80 MHz channels include of 64 and 256 subcarriers. However, in the measurements, the CSI was discarded from the guard and null subcarriers as they contain arbitrary values (F. Gringoli, M. Schulz, J. Link, and M. Hollick, "Free Your CSI: A Channel State Information Extraction Platform for Modern Wi-Fi Chipsets," in Proceedings of the 13th International Workshop on Wireless Network Testbeds, Experimental Evaluation & Characterization, pp. 21-28, 2019).

To evaluate the capability of ReWiS to generalize to different environments, CSI measurements were performed in three different environments. Specifically, the measurements were carried out in an office area $E_1$, a meeting room $E_2$, and a classroom $E_3$ on different days and times. The environment was carefully picked with exclusive furniture arrangements, size, and construction material to ensure that the target environments are mutually exclusive from the source environment in terms of propagation characteristics. However, visually, $E_1$ is more similar to $E_3$ than $E_2$. FIGS. 7A-C show the environment layout of environments $E_1$, $E_2$, and $E_3$, respectively, as well as the position of access point (AP), client, and CSI sniffers.

FIG. 7A is a schematic diagram of an example embodiment of a data collection and testing environment 700A referred to as Environment 1 (E1), or $E_1$, herein.

FIG. 7B is a schematic diagram of an example embodiment of a data collection and testing environment 700B referred to as Environment 2 (E2), or $E_2$, herein.

FIG. 7C is a schematic diagram of an example embodiment of a data collection and testing environment 700C referred to as Environment 1 (E3), or $E_3$, herein.

FIG. 7D is a legend 731 of symbols 727 used in FIGS. 7A-C, namely symbols for a CSI receiver (C) 708, access point (AP) 732, client (C) 733, walking pattern 735, and in-place activity 737.

The position of ReWiS components may influence the test outcome. Therefore, an attempt was made to loosely change the configuration in different environments and design the testbed to align with realistic home/office HAR scenarios and be close to those used in other CSI activity recognition studies (J. Zhang, F. Wu, B. Wei, Q. Zhang, H. Huang, S. W. Shah, and J. Cheng, "Data Augmentation and Dense-LSTM for Human Activity Recognition Using WiFi Signal," IEEE Internet of Things Journal, vol. 8, no. 6, pp. 4628-4641, 2020; C. Xiao, D. Han, Y. Ma, and Z. Qin, "CsiGAN: Robust Channel State Information-based Activity Recognition with GANs," IEEE Internet of Things Journal, vol. 6, no. 6, pp. 10191-10204, 2019).

B. Data Collection and Dataset Preparation

The two subjects involved in the experiments were instructed about the type, duration, and location of the activities including jumping, walking, and standing. Each measurement campaign involved 180 seconds of data collection for each activity performed by two people (IRB approval available upon request). The measurements are repeated 10 times with a time interval of at least 2 hours in between measurements. The collected raw data was processed by applying the CSI data preparation method presented in Section III-B. Upon aligning the data collected from 4 antennas of each Asus router, a window size of W=300 samples (tantamount to 3s) was used to segment the raw data into data-segments. Further, the data-segments were integrated using equation (1), disclosed above, to form the CSI data-frame $H_r$. As a result, through the explained measurement campaign with M=1 spatial stream, N=4 receive antennas, the CSI data-frame $H_r$ at 80 MHz is a matrix of size 1200×242. Thanks to the dimension reduction method proposed in Section III-B, the size of the data-frame is reduced to 242×242, which is about 80%. Data was collected in three different propagation environments, which are shown in FIGS. 7A-C, namely the environments $E_1$ 700A, $E_2$ 700B, and $E_3$ 700C of FIG. 7A, FIG. 7B, and FIG. 7C, respectively, which may be referred to herein as $E_1$, $E_2$, and $E_3$, respectively.

Environment $E_1$ is selected as the source environment, while $E_2$ and $E_3$ are considered as the target environments, and their dataset is entirely used for testing purposes. The ReWiS learning method presented in Section III-C has been trained using the prepared dataset, where 70% of the dataset is used for training while the remainder is used for testing and evaluation. Unless otherwise mentioned, the model was trained using 4-way-5-shot training tasks, i.e., 4 classes and 5 examples in both support and query tasks. The accuracy of the method was tested through sampling 1000 randomly generated testing tasks from the test sets. Two measures were used to report the results, namely accuracy and F1 score. The accuracy refers to the correct predictions divided by total predictions, while F1 score is defined as $$F1 \text{ score} = 2 \times \frac{\text{Precision} \cdot \text{Recall}}{\text{Precision} + \text{Recall}}$$

where Recall:=TP/(TP+TN) and Precision:=TP/(TP+FP). TP, TN and FP stand for true positive, true negative and false negative, respectively.

V. Performance Evaluation

Figures 8A, 8B:
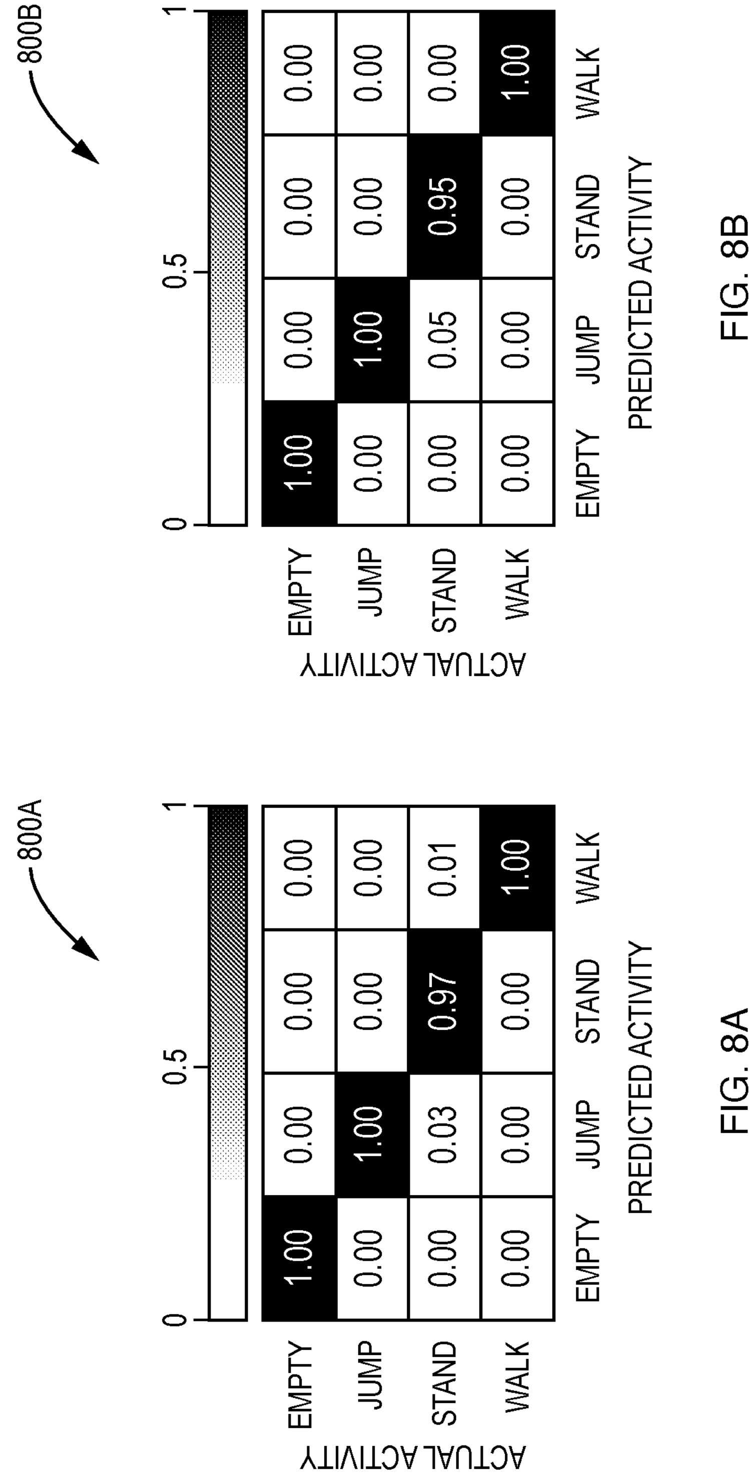
FIG. 8A and FIG. 8B are tables with example embodiments of experimental results of the performance of ReWiS.
Figures 10A, 10B, 10C, 10D:
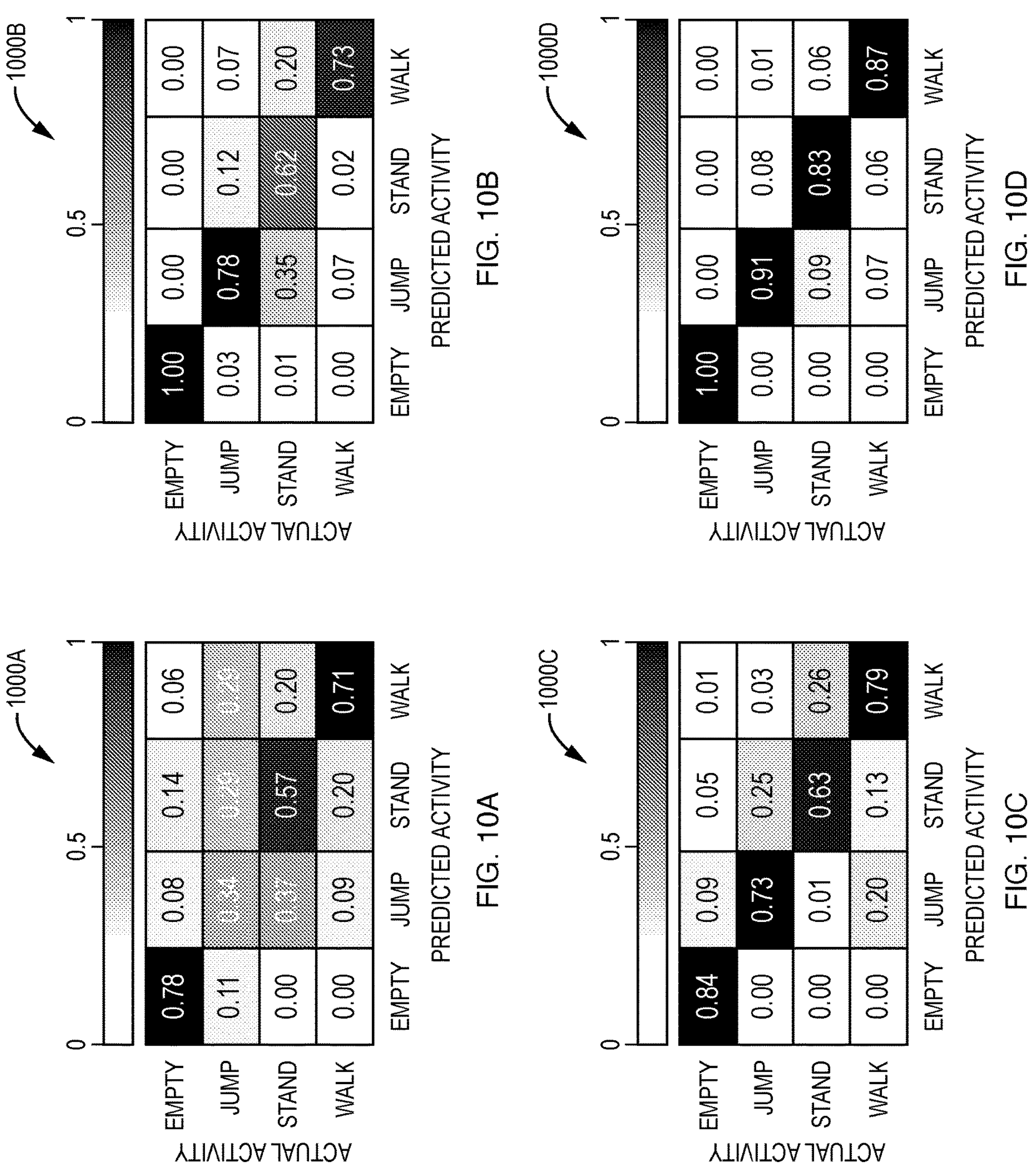
FIGS. 10A-D are tables with example embodiments of experimental results of an impact of frequency resolution and diversity, with one receiver.
Figures 11A, 11B, 11C, 11D:
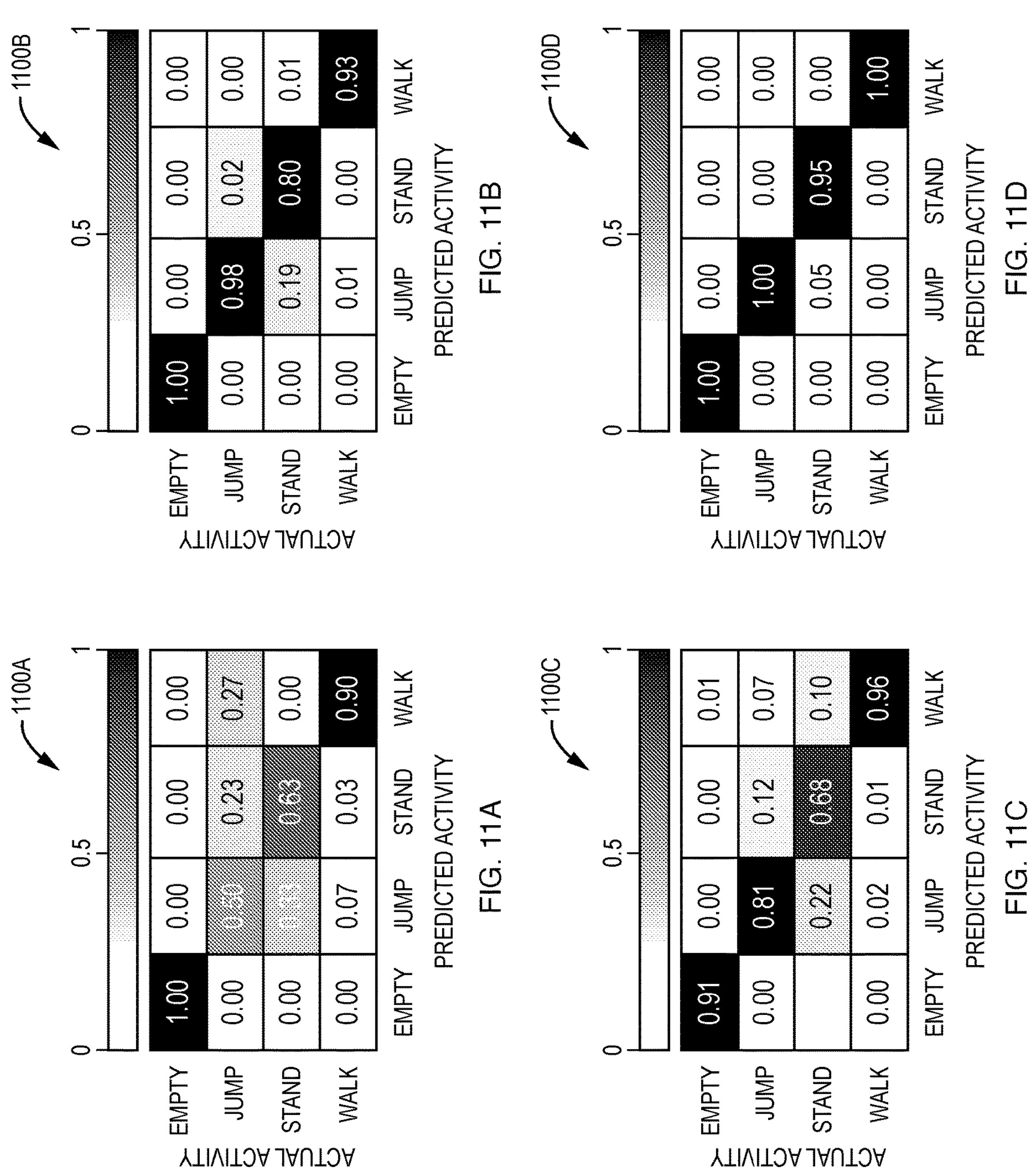
FIGS. 11A-D are tables with example embodiments of experimental results of an impact of frequency resolution and diversity, with multiple receivers.

In this section, the end-to-end performance evaluation of ReWiS is described. FIGS. 8A and 8B show the overall performance of ReWiS in terms of accuracy (acc) of predictions with 3 receivers, each with 4 antennas, at 80 MHz channels when tested in environment $E_2$ and $E_3$.

FIG. 8A and FIG. 8B are tables 800A and 800B, respectively, that show the performance of ReWiS in generalizing to the $E_2$ and $E_3$ environments, with 3 receivers, 4 antennas, 80 MHz. The table 800A shows that for $E_3$, acc=98.85, and table 800B shows that for $E_2$, acc=99.25. It can be seen that ReWiS not only learned very well from the source dataset but successfully generalized to the target environments, as it is able to achieve accuracy close to 100% in unseen environments by taking advantage of all three components of macro/micro diversity and subcarrier resolution, in addition to implementing ProtoNet with modified embedding learning.

FIG. 9 is a table 900 that includes example embodiments of experimental results that represent an impact of micro- and macro-diversity on the accuracy of the predictions. ReWiS is trained in $E_1$ and is tested in $E_2$ and $E_3$, disclosed above.

1) Impact of Macro- and Micro-diversity: Table 900 of FIG. 9 shows the impact of macro- and micro-diversity on the accuracy of the predictions. It can be seen that increasing the number of antennas from 1 to 4 increases the accuracy by 12% and 10% in environments $E_2$ and $E_3$, respectively. In addition, increasing the number of receivers from 1 to 3, improves the accuracy by 14% and 18% in environments $E_2$ and $E_3$, respectively. By looking closely at these results, it can be seen that, in general, micro-diversity (number of antennas) improves the accuracy of in-place activities, such as jump and stand, while macro-diversity improves the accuracy of walking. Interestingly, macro-diversity is helpful in discriminating walking from standing and jumping and micro-diversity increases the precision of differentiating jumping from standing.

2) Impact of Subcarrier Resolution: FIGS. 10A-D and FIGS. 11A-D show the impact of subcarrier resolution and the number of antennas by comparing the confusion matrices of ReWiS in 20 MHz and 80 MHz channels, respectively with 1 receiver and 3 receivers.

FIGS. 10A-D are tables 1000A-D, respectively, that show an example embodiment of the impact of frequency resolution and diversity, with one receiver. In the example embodiments of FIGS. 10A-D, $E_2$, disclosed above, is the target environment. In table 1000A, with 1 receiver, 1 antenna, 20 MHz, acc=59.75. In table 1000B, with 1 receiver, 1 antenna, 80 MHz, acc=78.25. In table 1000C, with 1 receiver, 4 antennas, 20 MHz, acc=74.83. In table 1000D, with 1 receiver, 4 antennas, 80 MHz, acc=90.42.

FIGS. 11A-D are tables 1100A-D, respectively, that show the impact of frequency resolution and diversity, with three receivers. In the example embodiments of FIGS. 11A-D, $E_2$, disclosed above, is the target environment. In table 1100A, with 3 receivers, 1 antenna, 20 MHz, acc=76.5. In table 1100B, with 3 receivers, 1 antenna, 80 MHz, acc=92.75. In table 1100C, with 3 receivers, 4 antennas, 20 MHz, acc=84.25. In table 1100D, with 3 receivers, 4 antennas, 80 MHz, acc=98.85.

It can be seen from FIGS. 10A-D that at 20 MHz with 1 receiver the accuracy diminishes by close to 20% in the worst case. The number of receivers improves the performance, but it can be noticed that higher resolution implies 6% better accuracy. In general, differentiating standing from jumping and walking is a challenging task, since the human subjects were allowed to make small body movements, like moving arms and head (as it is naturally). Based on this result, a conclusion can be drawn that higher frequency can be beneficial for detecting activities with micromovements like respiratory detection (S. Shi, Y. Xie, M. Li, A. X. Liu, and J. Zhao, "Synthesizing wider wifi bandwidth for respiration rate monitoring in dynamic environments," in IEEE INFOCOM 2019-IEEE Conference on Computer Communications, pp. 181-189, IEEE, 2019).

Figures 12A, 12B, 13:
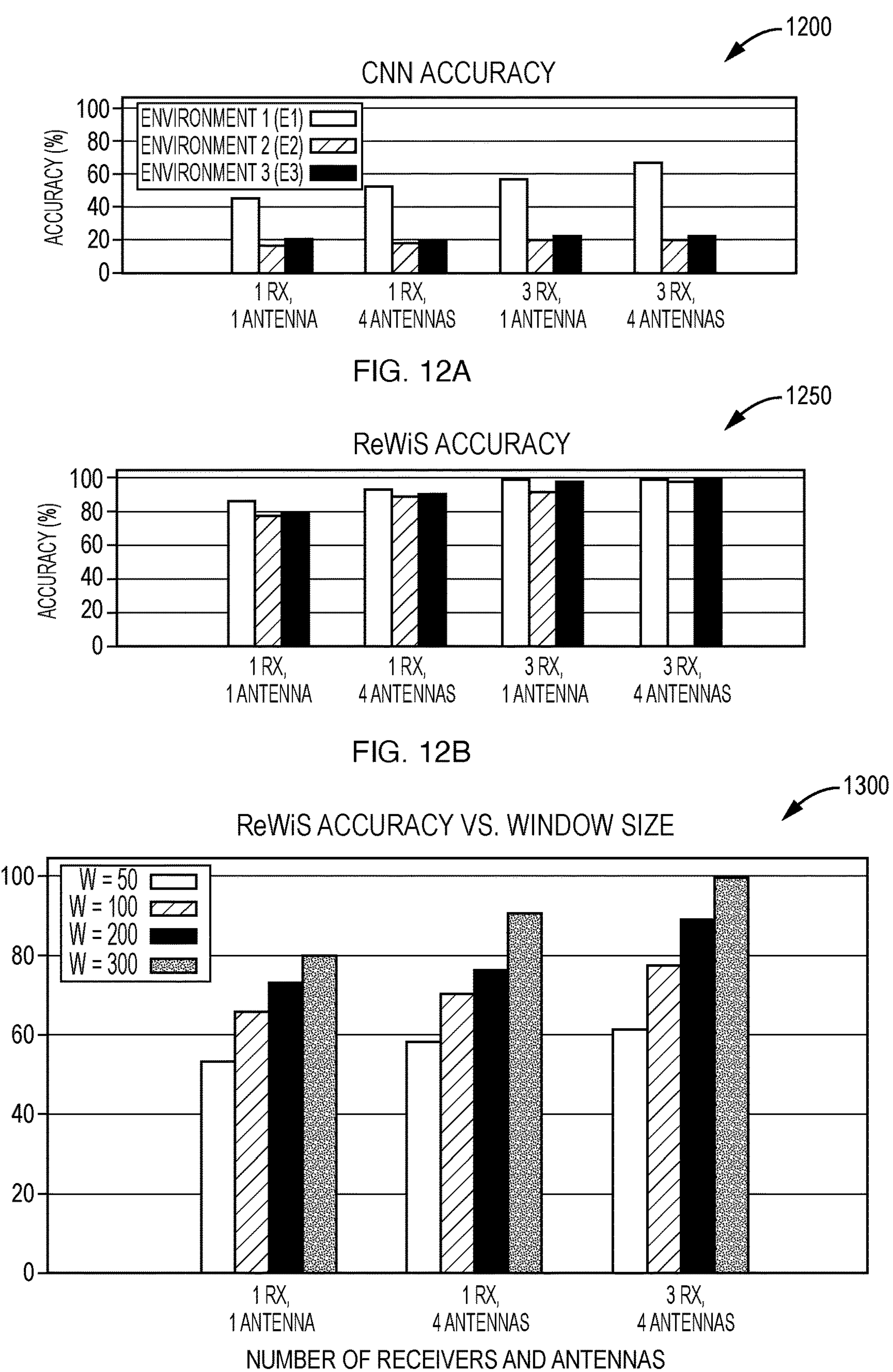
FIG. 12A is a bar chart of an example embodiment of convolutional neural network (CNN) accuracy performance.
FIG. 12B is a bar chart of an example embodiment of ReWiS accuracy performance.
FIG. 13 is a bar chart of an example embodiment of impact of diversity and window size.

3) Comparison of CNN vs. ReWiS: FIGS. 12A and 12B compare the performance of ReWiS learning framework with a baseline CNN classifier.

FIG. 12A is a bar chart 1200 of an example embodiment of convolutional neural network (CNN) accuracy performance.

FIG. 12B is a bar chart 1250 of an example embodiment of ReWiS accuracy performance. With reference to FIG. 12A and FIG. 12B, the classifier utilizes a CNN for feature extraction with the same structure as the one ReWiS uses for embedding function training, explained in Section III-C. Further, a 3-layer fully connected network is used for classification. Overall, the total number of parameters of the baseline classifier is comparable with the ReWis learning framework. It was noticed that the baseline model is able to learn from the CSI data collected in the source environment $E_1$, however, is not able to make accurate predictions in target environments. This happens since the baseline classifier's goal is to classify the CSI measurement. However, the ReWiS learning framework tends to learn how to learn, and achieves 35% better accuracy on the average.

4) Impact of windowing: FIG. 13 compares the performance of the method with different window sizes at 80 MHz channel.

FIG. 13 is a bar chart 1300 of an example embodiment of impact of diversity and window size. It can be seen that with a very small window size i.e., W=50, the accuracy of the predictions is very low and it does not improve much by increasing the diversity. Specifically, the bar chart 1300 of FIG. 13 shows that (i) by increasing the window size W, the number of receivers and the number of antennas per receiver, the performance improves by up to 35%, 12% and 10%, respectively. However, with a higher number of antennas, the window size can be decreased and still achieve acceptable accuracy. It is worth noting that reducing the window size reduces pre-processing time and complexity.

As disclosed herein, an example embodiment of ReWiS includes a novel framework for robust and environment-independent Wi-Fi sensing. ReWiS leverages multi-antenna multi-receiver diversity to improve the overall robustness, and may leverage a customized version of FSL to eliminate the need of application-specific feature extraction. ReWiS has been prototyped using off-the shelf Wi-Fi equipment, and its performance has been showcased by considering a human activity recognition. An extensive data collection campaign was performed, the impact of each diversity component on the performance evaluated, and ReWiS compared with a CNN-based approach. Experimental results have shown that ReWiS improves the performance by about 40% with respect to existing single-antenna low resolution approaches, and increases accuracy by 35% with respect to a CNN when tested in different environments. An example embodiment of ReWiS improves the state of the art in Wi-Fi sensing, by demonstrating superior generalization and robustness capabilities with respect to existing work.

Figure 14:
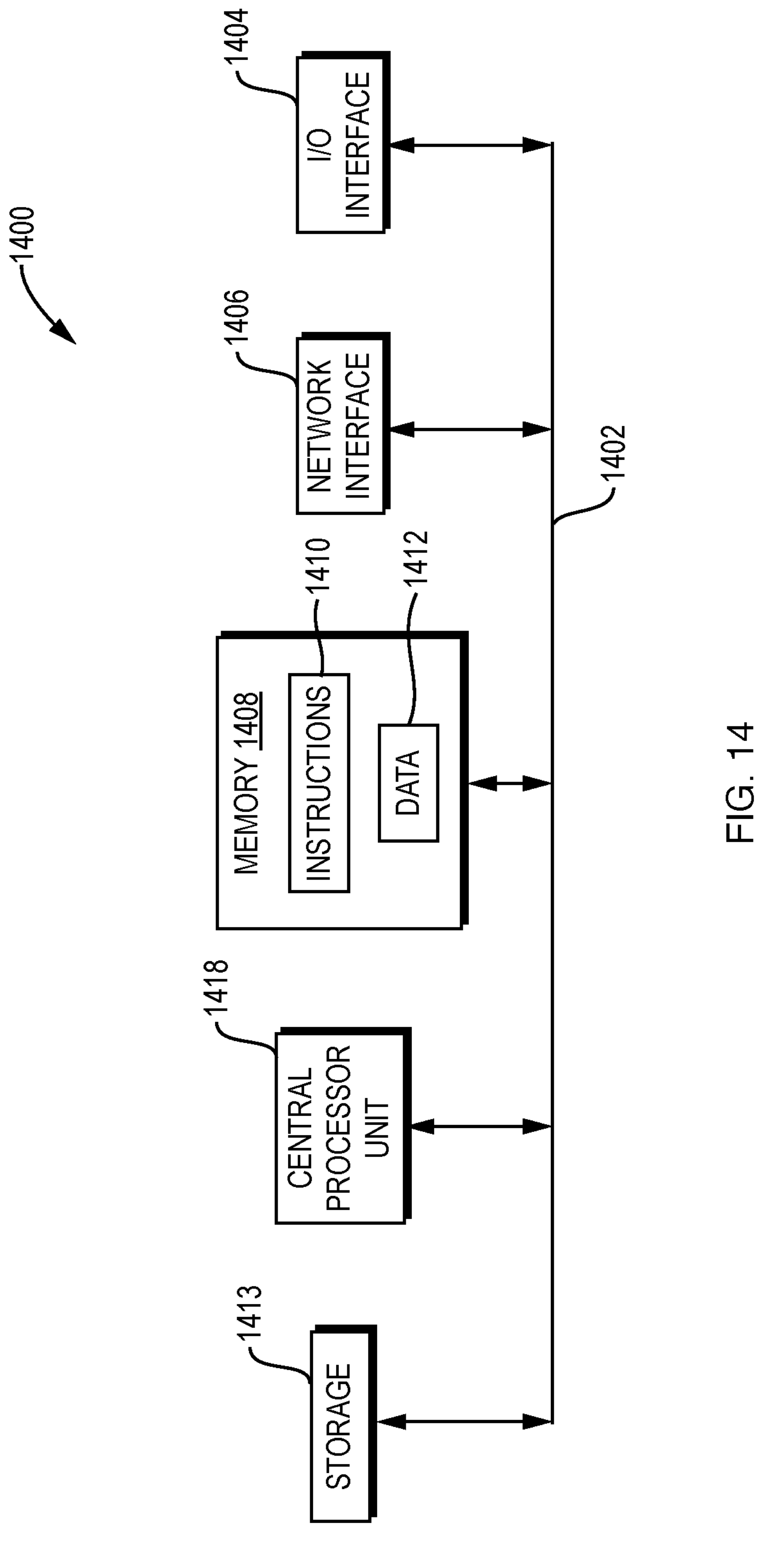
FIG. 14 is a block diagram of an example of the internal structure of a computer in which various embodiments of the present disclosure may be implemented.

FIG. 14 is a block diagram of an example of an internal structure of a computer 1400 in which various embodiments of the present disclosure may be implemented. The computer 1400 contains a system bus 1402, where a bus is a set of hardware lines used for data transfer among the components of a computer or digital processing system. The system bus 1402 is essentially a shared conduit that connects different elements of a computer system (e.g., processor, disk storage, memory, input/output ports, network ports, etc.) that enables the transfer of information between the elements. Coupled to the system bus 1402 is an I/O device interface 1404 for connecting various input and output devices (e.g., keyboard, mouse, display monitors, printers, speakers, microphone, etc.) to the computer 1400. A network interface 1406 allows the computer 1400 to connect to various other devices attached to a network (e.g., global computer network, wide area network, local area network, etc.). Memory 1408 provides volatile or non-volatile storage for computer software instructions 1410 and data 1412 that may be used to implement embodiments (e.g., method 200) of the present disclosure, where the volatile and non-volatile memories are examples of non-transitory media. Disk storage 1413 also provides non-volatile storage for the computer software instructions 1410 and data 1412 that may be used to implement embodiments (e.g., method 200) of the present disclosure. A central processor unit 1418 is also coupled to the system bus 1402 and provides for the execution of computer instructions.

Further example embodiments disclosed herein may be configured using a computer program product; for example, controls may be programmed in software for implementing example embodiments. Further example embodiments may include a non-transitory computer-readable-medium that contains instructions that may be executed by a processor, and, when loaded and executed, cause the processor to complete methods and techniques described herein. It should be understood that elements of the block and flow diagrams may be implemented in software or hardware, such as via one or more arrangements of the circuitry of FIG. 14, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer-readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system for sensing an environment, comprising:

a wireless transmitter device configured to transmit a wireless signal through the environment;

a plurality of wireless receiver devices each configured to 1) receive the wireless signal at a distinct location within the environment via at least one respective antenna and 2) generate a channel state information (CSI) packet indicating a state of a wireless communications channel associated with the wireless signal, the distinct location being distinct from a location of the wireless transmitter device;

a computing device configured to process the CSI packets from the plurality of wireless receiver devices and generate a CSI dataset as a function of the CSI packets processed, wherein the computing device is further configured to process the CSI packets by removing a subset of information from the CSI packets based on a measured value of the subset; and a classifier configured to determine at least one class for the CSI dataset.

2. The system of claim 1, wherein at least one receiver device of the plurality of wireless receiver devices includes a plurality of respective antennas including the at least one respective antenna.

3. The system of claim 2, wherein the at least one receiver device of the plurality of wireless receiver devices is further configured to generate the CSI packet as a function of the wireless signal as received at each of the plurality of respective antennas.

4. The system of claim 2, wherein the CSI packet generated by the at least one wireless receiver device of the plurality of wireless receiver devices indicates the state of the wireless communications channel at a plurality of distinct spatial points in the environment, each distinct spatial point of the distinct spatial points corresponding to a respective one of the plurality of respective antennas.

5. The system of claim 1, wherein the CSI packets indicate the state of the wireless communications channel at a plurality of distinct points in time and frequency.

6. The system of claim 1, wherein at least one wireless receiver device of the plurality of wireless receiver devices is configured to generate a plurality of CSI packets of the CSI packets, each CSI packet of the plurality of CSI packets indicating the state of the wireless communications channel at a distinct point in time and frequency.

7. The system of claim 1, wherein the classifier is trained via a training dataset and a few-shot learning (FSL) process.

8. The system of claim 1, wherein the classifier is further configured to determine the at least one class based on at least one previous class that was determined for a prior CSI dataset obtained at an earlier point in time relative to the CSI dataset.

9. The system of claim 1, wherein the at least one class includes classes corresponding to at least one of i) no movement within the environment, and ii) movement of an object within the environment.

10. The system of claim 1, wherein the at least one class includes classes corresponding to at least one of i) no persons within the environment, ii) a person walking within the environment, iii) a person running within the environment, iv) a person jumping within the environment, and v) a person respiring within the environment.

11. The system of claim 1, wherein the computing device includes the classifier, wherein the computing device is further configured to collect the CSI packets from multiple receivers of the plurality of wireless receiver devices, simultaneously, and to align, in time and frequency domains, data from the CSI packets collected from the multiple receivers, and wherein the wireless transmitter device, the computing device, and the multiple receivers are located at different locations of the environment.

12. The system of claim 1, wherein, to process the CSI packets, the computing device is further configured to perform singular value decomposition (SVD) on CSI data of the CSI packets.

13. A method for sensing an environment, the method comprising:

transmitting, by a wireless transmitter device, a wireless signal through the environment;

at each wireless receiver of a plurality of wireless receiver devices, 1) receiving the wireless signal at a distinct location within the environment via at least one respective antenna and 2) generating a channel state information (CSI) packet indicating a state of a wireless communications channel associated with the wireless signal, the distinct location being distinct from a location of the wireless transmitter device;

processing, by a computing device, the CSI packets from the plurality of wireless receiver devices, wherein processing the CSI packets includes removing a subset of information from the CSI packets based on a measured value of the subset;

generating, by the computing device, a CSI dataset as a function of the CSI packets processed; and determining, by a classifier, at least one class for the CSI dataset generated.

14. The method of claim 13, wherein at least one wireless receiver of the plurality of wireless receiver devices includes a plurality of respective antennas including the at least one respective antenna and wherein the method further comprises, at the at least one wireless receiver, generating the CSI packet as a function of the wireless signal as received at each of the plurality of respective antennas.

15. The method of claim 14, wherein the CSI packet generated by the at least one wireless receiver of the plurality of wireless receiver devices indicates the state of the wireless communications channel at a plurality of distinct spatial points in the environment, each distinct spatial point of the distinct spatial points corresponding to a respective one of the plurality of respective antennas.

16. The method of claim 13, wherein the CSI packets indicate the state of the wireless communications channel at a plurality of distinct points in time and frequency.

17. The method of claim 13, further comprising generating, by at least one wireless receiver of the plurality of wireless receiver devices, a plurality of CSI packets of the CSI packets, each CSI packet of the plurality of CSI packets indicating the state of the wireless communications channel at a distinct point in time and frequency.

18. The method of claim 13, wherein the method further comprises:

training the classifier via a training dataset and a few-shot learning (FSL) process; and determining the at least one class based on at least one previous class that was determined by the classifier for a prior CSI dataset obtained at an earlier point in time relative to the CSI dataset.

19. The method of claim 13, wherein the at least one class includes classes corresponding to at least one of i) no movement within the environment, and ii) movement of an object within the environment.

20. The method of claim 13, wherein the at least one class includes classes corresponding to at least one of i) no persons within the environment, ii) a person walking within the environment, iii) a person running within the environment, iv) a person jumping within the environment, and v) a person respiring within the environment.

21. A non-transitory computer-readable medium for sensing an environment, the non-transitory computer-readable medium having encoded thereon a sequence of instructions which, when loaded and executed by at least one processor, causes the at least one processor to:

process channel state information (CSI) packets received from a plurality of wireless receiver devices, each wireless receiver of the plurality of wireless receiver devices having 1) received a wireless signal at a distinct location within the environment via at least one respective antenna and 2) generated a CSI packet of the CSI packets received, the CSI packet indicating a state of a wireless communications channel associated with the wireless signal, the wireless signal transmitted through the environment, the distinct location being distinct from a location of the wireless transmitter device, wherein processing the CSI packets includes removing a subset of information from the CSI packets based on a measured value of the subset;

generate a CSI dataset as a function of the CSI packets processed; and determine at least one class for the CSI dataset generated.

22. The method of claim 13, wherein the computing device includes the classifier and wherein the method further comprises:

collecting, by the computing device, the CSI packets from multiple receivers of the plurality of wireless receiver devices, simultaneously; and aligning, in time and frequency domains by the computing device, data from the CSI packets collected from the multiple receivers, wherein the wireless transmitter device, the computing device, and the multiple receivers are located at different locations of the environment.

23. The method of claim 13, wherein the processing of the CSI packets includes performing singular value decomposition (SVD) on CSI data of the CSI packets.

* * * * *